US006954925B1

(12) United States Patent
Kong

(10) Patent No.: US 6,954,925 B1
(45) Date of Patent: Oct. 11, 2005

(54) METHOD OF PARSING COMMANDS USING LINEAR TREE REPRESENTATION

(75) Inventor: Fan Kong, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 630 days.

(21) Appl. No.: 09/896,044

(22) Filed: Jun. 28, 2001

Related U.S. Application Data

(63) Continuation of application No. 09/690,273, filed on Oct. 17, 2000.

(51) Int. Cl.$^7$ ............................................... G06F 9/45

(52) U.S. Cl. ..................................................... 717/143

(58) Field of Search ....................... 717/114, 121, 143; 345/841, 843; 707/202, 100

(56) References Cited

U.S. PATENT DOCUMENTS

| 4,862,390 A | * | 8/1989 | Weiner ..................... 345/822 |
| 5,263,174 A | * | 11/1993 | Layman .................... 345/841 |
| 5,557,730 A | * | 9/1996 | Frid-Nielsen ............... 715/839 |
| 5,778,223 A | * | 7/1998 | Velissaropoulos et al. .. 707/100 |
| 5,950,187 A | * | 9/1999 | Tsuda ......................... 707/3 |
| 5,991,771 A | * | 11/1999 | Falls et al. .................. 707/202 |
| 6,011,555 A | * | 1/2000 | Eckhoff et al. ............. 345/843 |
| 6,088,649 A | * | 7/2000 | Kadaba et al. .............. 701/201 |

OTHER PUBLICATIONS

Alfred V. Aho, et al., "Principles of Compiler Design," Apr. 1979, pp. 145-196 and 245-295.

* cited by examiner

Primary Examiner—Tuan Dam
Assistant Examiner—Kuo-Liang Tang
(74) Attorney, Agent, or Firm—Hickman Palermo Truong & Becker, LLP

(57) ABSTRACT

A method of regenerating a network device configuration command based on configuration data stored in the network device is provided. The configuration data is created as a result of parsing and processing of the configuration command. The command comprises at least one command element that can have a plurality of values. At least one linear node is created and stored in a parse tree for representing said at least one command element. The linear node comprises a begin option node having a single entrance; a next option node coupled to the begin option node; and an end option node coupled to the begin option node. The end option node has a single exit. A linear command regeneration template is created and stored in a memory. The linear command regeneration template comprises information identifying how to regenerate a command. The command is then regenerated based on the linear command regeneration template and based on data from a database. Each of the plurality of branches represents one possible value of a command element of the configuration command. Each branch is connected back to the begin option node through a next option node. During parsing of a command, each command element is represented by a different linear node.

21 Claims, 14 Drawing Sheets

400

METHOD OF PARSING COMMANDS USING LINEAR TREE REPRESENTATION

CROSS-REFERENCE TO RELATED APPLICATIONS

Continuation of application Ser. No. 09/690,273, filed Oct. 17, 2000, from which domestic priority is hereby claimed under 35 U.S.C. 120, and the entire disclosure of which is hereby incorporated by reference as if fully set forth herein.

FIELD OF INVENTION

The present invention generally relates to data processing. The invention relates more specifically to a determining a reverse path through a command parse tree based on system configuration information.

BACKGROUND OF THE INVENTION

Typically, when an operating system command is used to configure a network device such as a router, a parser processes the command using a binary parse tree. The router is configured as specified in the operating system command based on information derived from the parsing. The data used to configure the router is stored in a system configuration database. After numerous operating system commands have been processed, the format of the system configuration database does not readily reveal the format of the commands.

Frequently, it is necessary to access the information in the system configuration database and reconstruct the command or commands that were used to configure the router. This can be a formidable problem that requires significant time to execute.

As a demonstration of the problem, consider binary parse tree 100 of FIG. 1. Binary parse tree 100 is an example of a parse tree that may be used in an operating system of a router in processing configuration commands. At each of nodes 101 to 119, there can be zero, one, or two branches. The path that terminates at each of the end nodes of binary parse tree 100 represents a configuration state for the router. The particular configuration state obtained when the configuration command represented by binary parse tree 100 is executed is stored in the system configuration database.

To regenerate the original configuration command, the information in the system configuration database was used and each route through binary parse tree 100 was tested for validity. For a simple binary parse tree, such as tree 100, this could be done relatively quickly. However, the number of paths grows exponentially/geometrically with the number of tree layers and nodes. Consequently, the execution time required increased significantly as the commands became more complex. Unfortunately, given constraints in router hardware, and due to the complex syntax of configuration commands and the large number of parameter values that they may include, improvements in the execution time would appear to require significant advances in router hardware performance.

Thus, there is a need to determine a reverse path through a parse tree, based on stored configuration information, for the purpose of re-constructing a device configuration command, in a way that overcomes the foregoing disadvantages.

SUMMARY OF THE INVENTION

The foregoing needs, and other needs and objects that will become apparent for the following description, are achieved in the present invention, which comprises, in one aspect, a method of regenerating a network device configuration command based on configuration data stored in the network device is provided. The configuration data is created as a result of parsing and processing of the configuration command. The command comprises at least one command element that can have a plurality of values. At least one linear node is created and stored in a parse tree for representing said at least one command element. The linear node comprises a begin option node having a single entrance; a next option node coupled to the begin option node; and an end option node coupled to the begin option node. The end option node has a single exit. A linear command regeneration template is created and stored in a memory. The linear command regeneration template comprises information identifying how to regenerate a command. The command is then re-generated based on the linear command regeneration template and based on data from a database.

According to one feature, each of the plurality of branches represents one possible value of a command element of the configuration command. Each branch is connected back to the begin option node through a next option node. During parsing of a command, each command element is represented by a different linear node.

According to another embodiment, a method of regenerating a network device configuration command based on configuration data stored in the network device, wherein parsing and processing of the configuration command resulted in storage of the configuration data, is provided. A linear command regeneration template including a linear node template is created and stored in a memory. The linear node template comprises a begin option node template, a next option node template, and an end option node template. The command is regenerated based on the linear command regeneration template and based on data from a database. In one feature, regeneration involves scanning the linear command regeneration template to find an end option node template that includes an identification of the begin option node template, passing the linear node template from the linear command regeneration template to an evaluate branches process, and evaluating at least one branch in the linear node template from the linear command regeneration template by the evaluate branches process. Such evaluation involves finding a branch in the linear node template and validating the branch using the data from the database.

In other aspects, the invention encompasses a network device, memory, apparatus, and computer readable medium configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for re-constructing a network device configuration command based on configuration data stored in the network device is described. In this description, the terms "reconstruct" and "regenerate" are used interchangeably in reference to network device commands to refer to generating a copy of a network device command that was used to configure a network device based on information other than the command itself. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
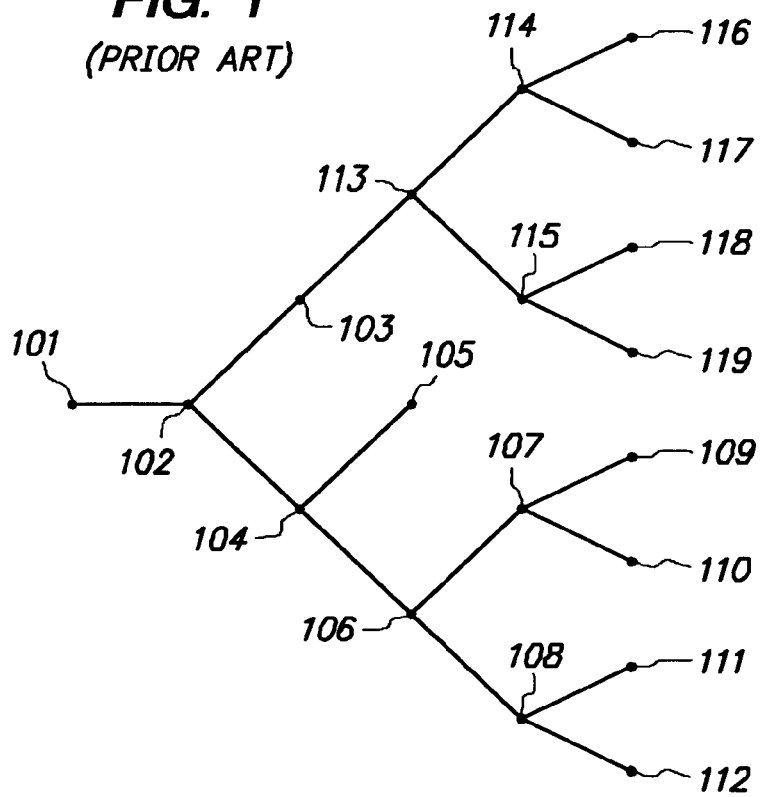
FIG. 1 is a diagram of a binary parse tree.
Figure 2A:
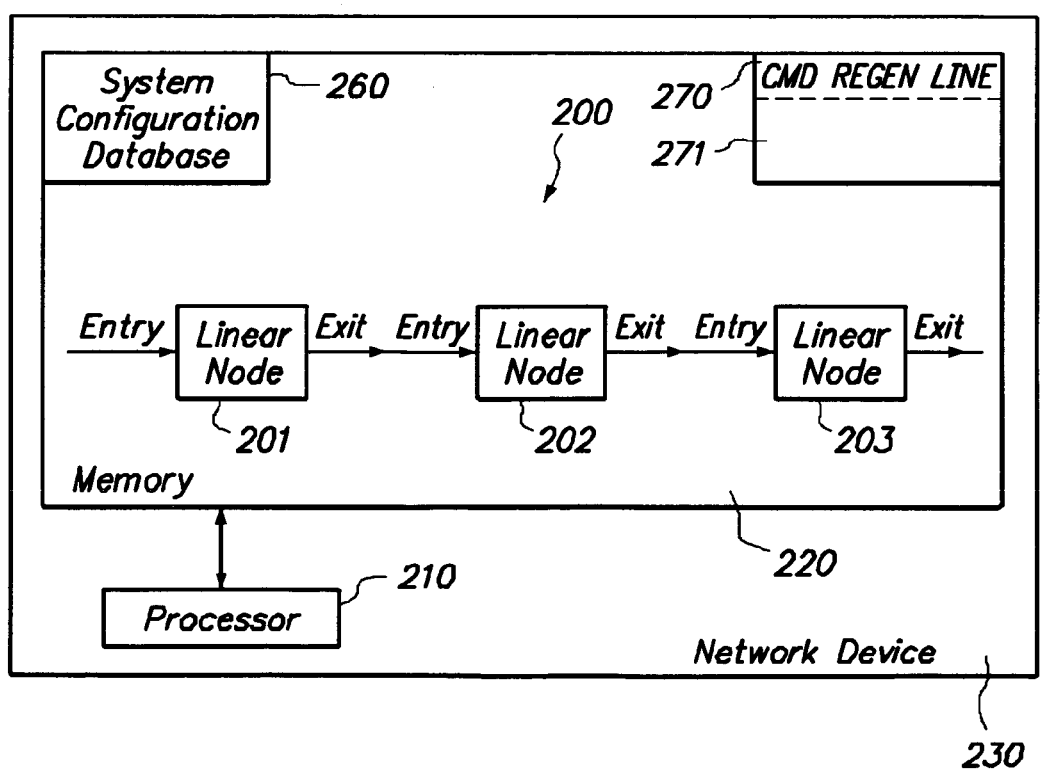
FIG. 2A is a diagram of a network device that includes a memory storing a linear parse tree, and a linear command regeneration template.

FIG. 2A is a diagram of a network device that includes a memory storing a linear parse tree, and a linear command regeneration template. Embodiments described herein use a linear parse tree 200. Linear parse tree 200 is a structure in a memory 220. Linear parse tree 200 provides functionality parsing a configuration command for a network device 230, such as a router. In this description, use of embodiments with an operating system and configuration commands for a router are described as examples; however, embodiments are not limited to such a context. The linear nodes and linear parse tree described herein can be incorporated in any configuration or system that utilized a binary parse tree.

Linear parse tree 200 changes the geometric progression of a binary parse tree to a linear progression. Therefore, regenerating a system configuration command from data in a system configuration database 260 occurs faster. For example, to process twenty-seven successive option branches, each having two options, using a binary parse tree required $2^{27}$ units of processing. Processing the same twenty-seven successive options using the approaches described herein, in one embodiment, may require 2*27, or 54, units of processing (plus overhead). Consequently, while providing the same functionality as prior approaches, linear parse tree 200 significantly enhances performance. Moreover, the linear progression associated with linear parse tree 200 permits easy scaling of commands without incurring a geometric increase in processing time.

Linear parse tree 200 includes a plurality of linear nodes 201 to 203. Each of linear nodes 201 to 203 has a single entry and a single exit. The use of three linear nodes is illustrative only and is not intended to limit embodiments to any particular number; any number of linear nodes can be utilized.

Figure 2B:
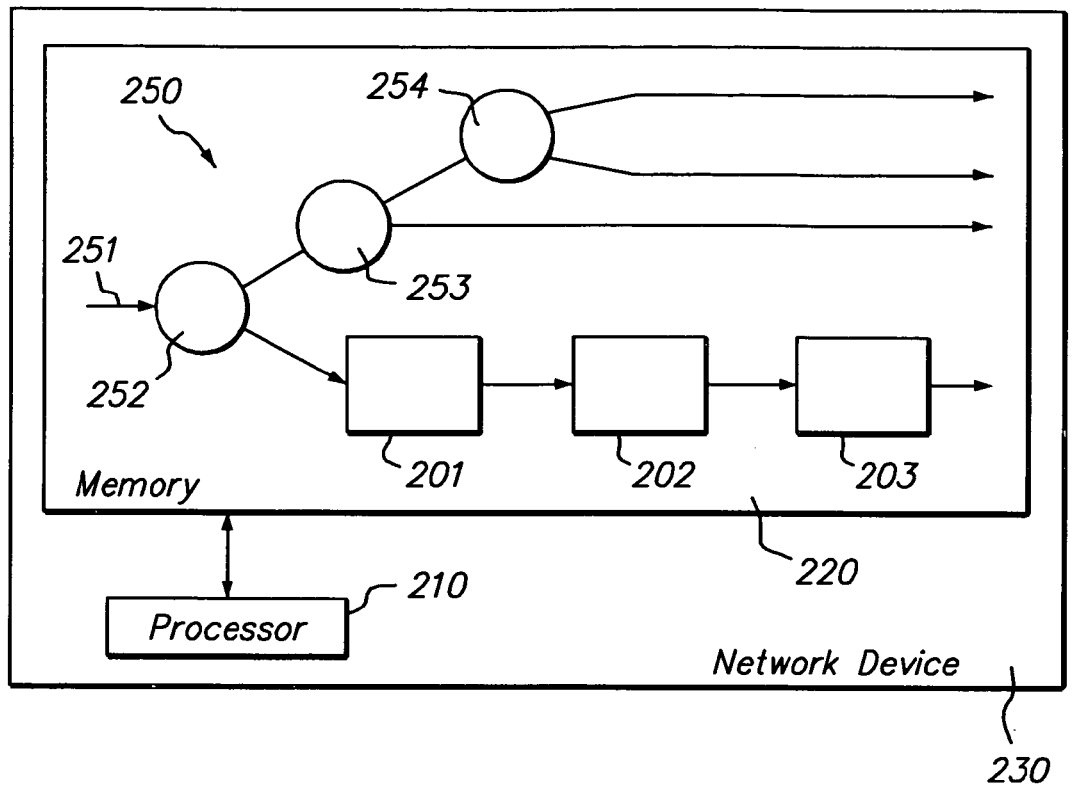
FIG. 2B is a diagram of a network device that includes a memory storing a linear parse tree, and a linear command regeneration template wherein the linear parse tree is a part of a binary parse tree.

In one embodiment, only linear nodes are used in linear parse tree 200. Alternatively, if desired, a parse tree 250 as shown in FIG. 2B can be created in memory 220 that includes a plurality of binary nodes 252, 253, and 254 and one or more linear nodes, e.g., linear nodes 201 to 203 in FIG. 2B. Linear nodes 201 to 203 are not simply binary nodes that are allowed one option path. In contrast, as explained more completely below, linear nodes 201 to 203 (FIGS. 2A and 2B) permit the same functionality that was achieved in prior approaches without incurring the geometric increase in processing time as the complexity of the parse tree increases.

Each of linear nodes 201 to 203 is constructed using a set of versatile branching tokens that include a begin option token 301 (FIG. 3), sometimes called begin option node 301, and an end option token 302, sometimes called end option node 302. Herein, only linear node 201 is considered in detail. In view of this description, those of skill can construct other linear nodes that implement the desired functionality.

Figure 3:
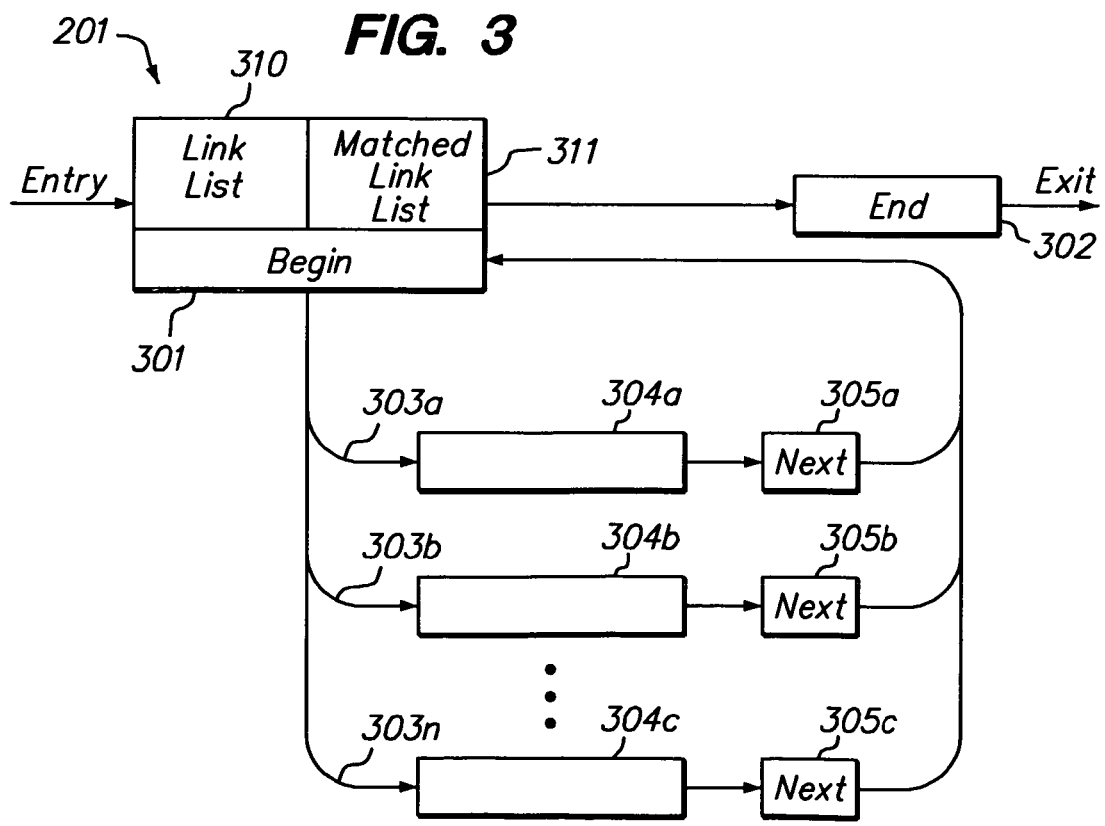
FIG. 3 is a diagram of a linear node structure.

As illustrated in FIG. 3, in linear node 201, begin option node 301 has a direct link to end option node 302. Begin option node 301 has a single entry, and also includes a list of links 310 with each entry in the list being a link to one of parallel branches 303a to 303n.

Each of branches 303a to 303n has a similar structure. In one embodiment, each of boxes 304a to 304n represents one possible value of a command element of the configuration command. If an input value of the command element in the configuration command matches the value represented by the box, processing transfers to a next option node that in turn branches back to begin option node 301. The matched branch is added to matched link list 311, sometimes called matched branch list 311.

The action taken by begin option node 301 upon processing being returned from a next option node depends on the configuration of begin option node 301. Begin option node 301 can be configured so that (i) when a single match is obtained, processing is transferred to end option node 302; (ii) when any combination of matches is obtained, processing is transferred to end option node 302; (iii) when all branches match processing is transferred to end option node 303; or (iv) when a count of the number of pushes of the branch equals the array count of a generic array processing is transferred to end option node 303.

In one embodiment, one or more of boxes 304a to 304n can be another linear node, i.e., a linear node can be included within a linear node, i.e., there is a pointer to a special data structure of possible paths in option. In particular, the linear nodes can be recursive. In this embodiment, the inner linear node would be processed as described herein, and then processing would revert back to the outer linear node. The linear characteristics are maintained.

Figure 4A:
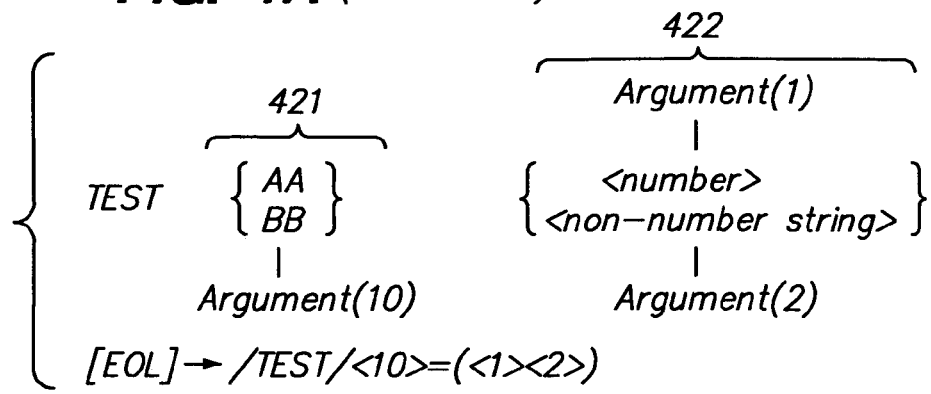
FIG. 4A is an illustration of a network device configuration command.

FIG. 4A is an illustration of a network device configuration command. The configuration command is TEST. In this embodiment, a first command element 421 can have values "A" or "B" and the value specified in the configuration command is assigned to argument ten. A second command element 422 can be either a number, or a non-number string. If the value of the second command element is a number, the value is assigned to argument one. If the value of the second command element is a non-number string, the value is assigned to argument two.

The configuration command of FIG. 4A is input to network device 230 using an input device, or alternatively the configuration command could be supplied over via a network interface. The process of entering the configuration command is well known.

In response to entry of the configuration command the network device operating system, or another process executing on network device 230 processes the configuration command. Herein, when it is stated that the network device or an operation in a method takes a particular action or results in a particular action, those of skill in the art will understand that one or more instructions have been executed by the processor in the device and as a result the stated operations are performed.

Figure 4B:
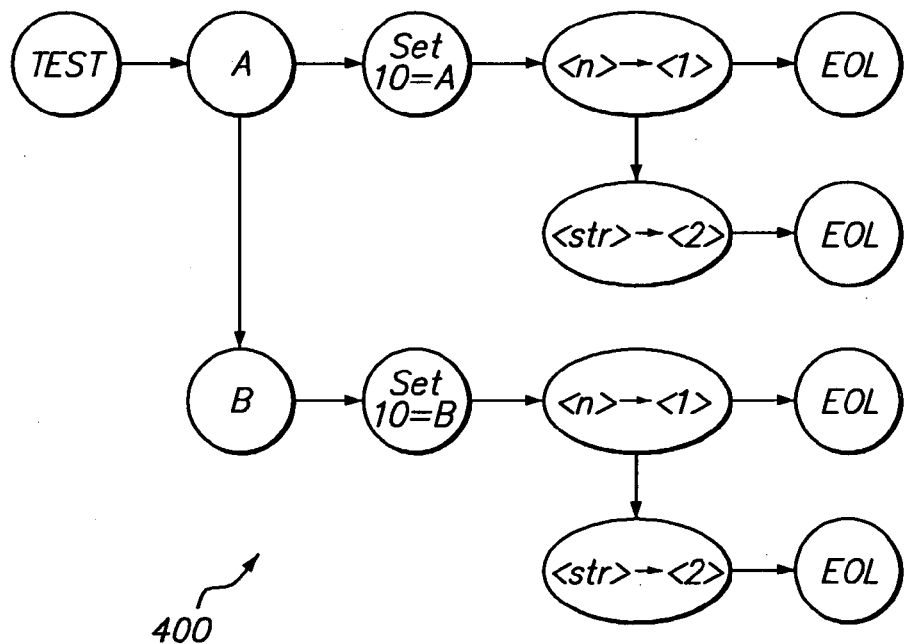
FIG. 4B is a binary parse tree for the network device configuration command of FIG. 4A.
Figure 4C:
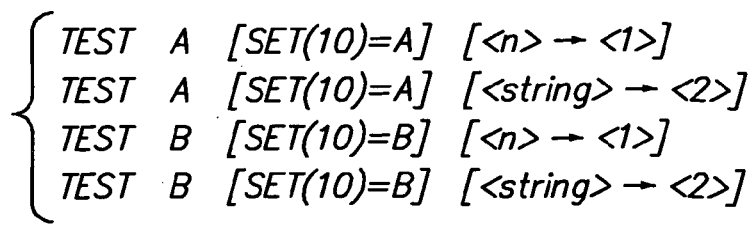
FIG. 4C is an illustration of binary node path templates stored for regeneration of the network device configuration command of FIG. 4A.

FIG. 4B is an example of a prior art binary parse tree 400 for configuration command TEST of FIG. 4A. FIG. 4C is the prior art sequence of paths for binary parse tree 400 that were used to regenerate the command using information in system configuration database 260. The creation of the binary parse tree and the sequence of paths is known to those of skill in the art and so is not described further.

Each of the paths in FIG. 4C was evaluated to regenerate command TEST using data in system configuration database 260. In this simple example, only four paths were evaluated. However, a more complex configuration command could have, for example, as many as 5,760 separate paths that have to be evaluated to regenerate the complex configuration command.

Figure 4D:
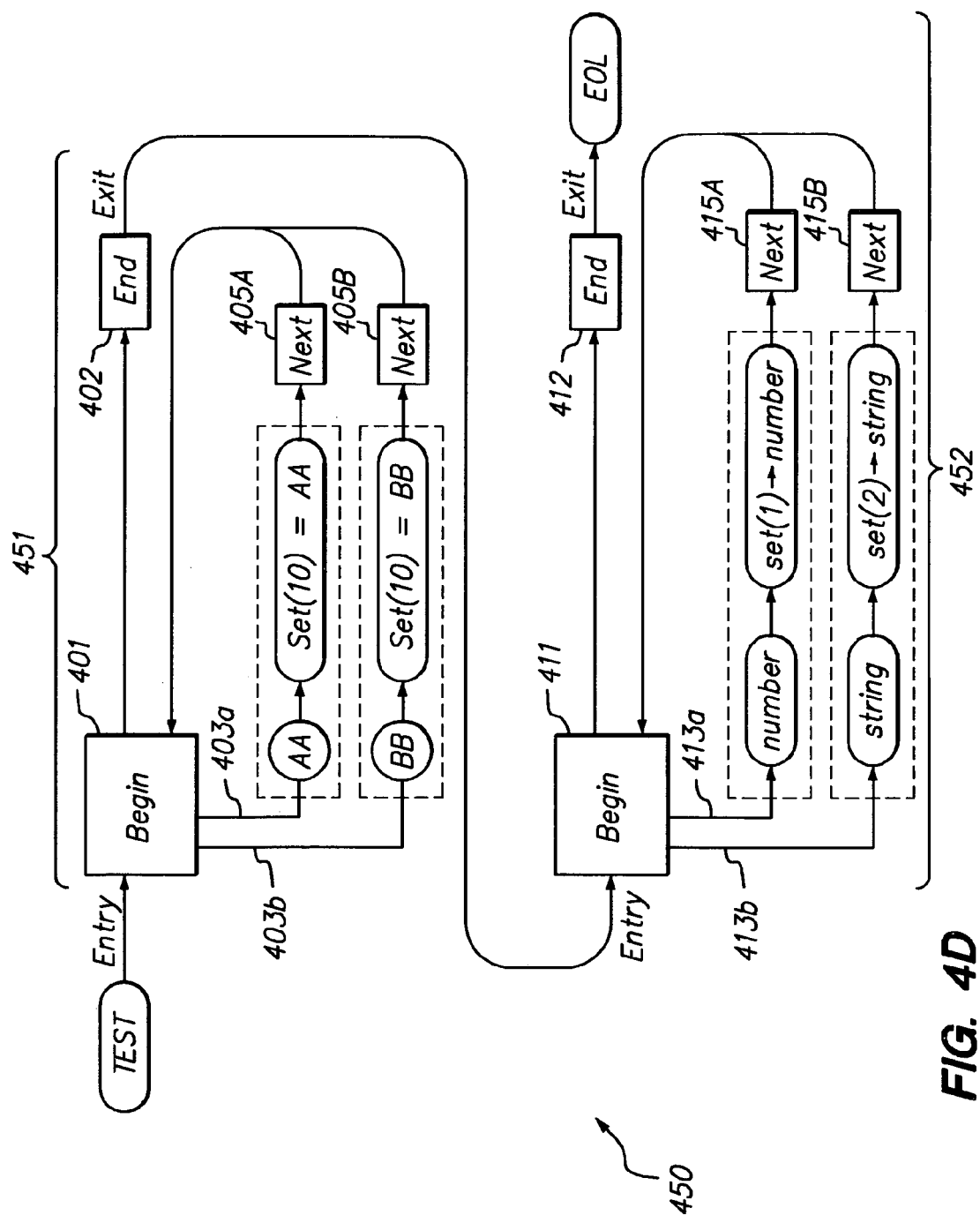
FIG. 4D is a detailed diagram of a linear parse tree for the network device configuration command of FIG. 4A.

FIG. 4D is a linear parse tree 450, using linear nodes 451, 452 of this invention. Linear parse tree 450 is a structure in a memory (not shown). Linear parse tree 450 starts with begin option node 401 that has a single entry, and includes two branches 403a and 403b, one for each of the possible values of first command element 421. In each of branches 403a and 403b, if the test for the value is true, argument ten is set to the value and processing transfers to the next node, one of next option nodes 405a and 405b, respectively, in the branch. The next option node returns processing to begin option node 401. Thus, each next option node 405a and 405b is coupled to begin option node 401.

In the example of FIG. 4A, the first command element can have either the value AA, or the value BB. Consequently, parameter flags in begin option node 401 is set to single branch.

When a match is detected and processing passes through a next option node back to begin option node 401, begin option node 401 transfers to end option node 402, which performs any necessary clean up. End option node 402, which has only a single exit, transfers to a second begin option node 411.

In this example, begin option node 411 also includes two branches 413a and 413b, one for each of the possible values of second command element 422. In branch 413a, if the test for a number is true, argument one is set to the number and processing transfers to next option node 415a. Next option node 415a returns processing to begin option node 411. In branch 413b, if the test for a string is true, argument two in branch 413b is set to the string and processing transfers to next option node 415b. Next option node 415b returns to begin option node 411. If neither branch is true, an error message to the user is generated.

In the example configuration command of FIG. 4A, second command element 421 can be either a number or the non-number string. Consequently, parameter flags in begin option node 411 also is set to single branch. Consequently, when a match is detected and processing passes through a next option node back to begin option node 411, begin option node 411 transfers to end option node 412, which performs any necessary clean up. End option node 412 transfers to an end of line EOL that writes the parsed configuration command to system configuration database 260. Configuration of the system using the data from the parsed configuration command may be carried out in conventional manner.

As a part of parsing a configuration command, a linear command regeneration template 270 (FIG. 2A), i.e., one line, is written to a file 271 in memory 220. Linear command regeneration template 270 subsequently is used to regenerate the configuration command using the data in system configuration database 260, as described more completely below. The general format for command regeneration template 270 is given in TABLE 2. (In this description, the designation "Table 1" is intentionally omitted.)

TABLE 2

| Command | {B} P1 {N} P2 {N} ... {N} {E} ... {B} P1 {N} P2 {N} ... {N} {E} |
|---|---|

Each command element is represented by a linear node that has a begin option node template {B} and an end option node template {E}, i.e., the linear node is delimited by the begin option node template {B} and the end option node template {E}. The various paths, sometimes called branches or options, from a begin option node {B} are represented by P1, P2, . . . , and are followed by a next option node template {N}. Paths P1, P2, . . . , are generic representations for the first and second paths of a linear node and are not intended to indicate that, for example, the first path of every linear node is the same. Irrespective of the number of command elements and the number of branches associated with a command element, a single linear line is written to file 271.

To better understand the linear command regeneration template consider configuration command TEST, as illustrated in FIG. 4A. For configuration command TEST, linear command regeneration template 270 that is written to file 271 is presented in TABLE 3.

TABLE 3

| TEST | {B, 2, S, ID1, 0 } AA, <10, AA> {N, ID1} |
| --- | --- |
| | BB, <10, BB> {N, ID1 } {E, ID1} |
| | (B, 2, S, ID2, 0} <n>, <1, <n>> {N, ID2} |
| | string, <2, string> {N, ID2} {E, ID2} |

TABLE 4 presents a comparison of the general format of TABLE 2 with the specific implementation of TABLE 3 for the first command element of configuration command TEST. TABLE 4 assists in relating the general format to both the configuration command and linear parse tree 450.

TABLE 4

| General Format for Linear Node | Specific Implementation |
| --- | --- |
| {B} | {B, 2, S, ID1, 0} |
| P1 | AA <10, AA> |
| {N} | {N, ID1} |
| P2 | BB <10, BB> |
| {N} | {N, ID1} |
| {E} | {E, ID1} |

In the embodiment of FIG. 4D, the begin option node template for begin option node 401 is written with a "B" to identify the node as a begin option node of linear node 451 for first command element 420. Following the "B," is a number that represents the number of branches associated with begin option node 401, which is two. Next is parameter flags, which is set to single in this example. Following parameter flags is an identifier for linear node 451, which is explained more completely below. Finally, a bypass flag is either set to true or false to indicate that linear node 451 includes a bypass. Thus, in this implementation, in general, a begin option node template is written in linear command regeneration template as:

{B, No. of branches, flags, Linear Node ID, Bypass}

Branch P1 first identifies the value of the command element for which the branch tests, e.g., "AA" and the argument that is set to value "AA" if the test is true. The format for branch P2 is similar. Next option node templates {N} are written with the linear node identifier, as are end option node templates {E}.

Figure 4E:
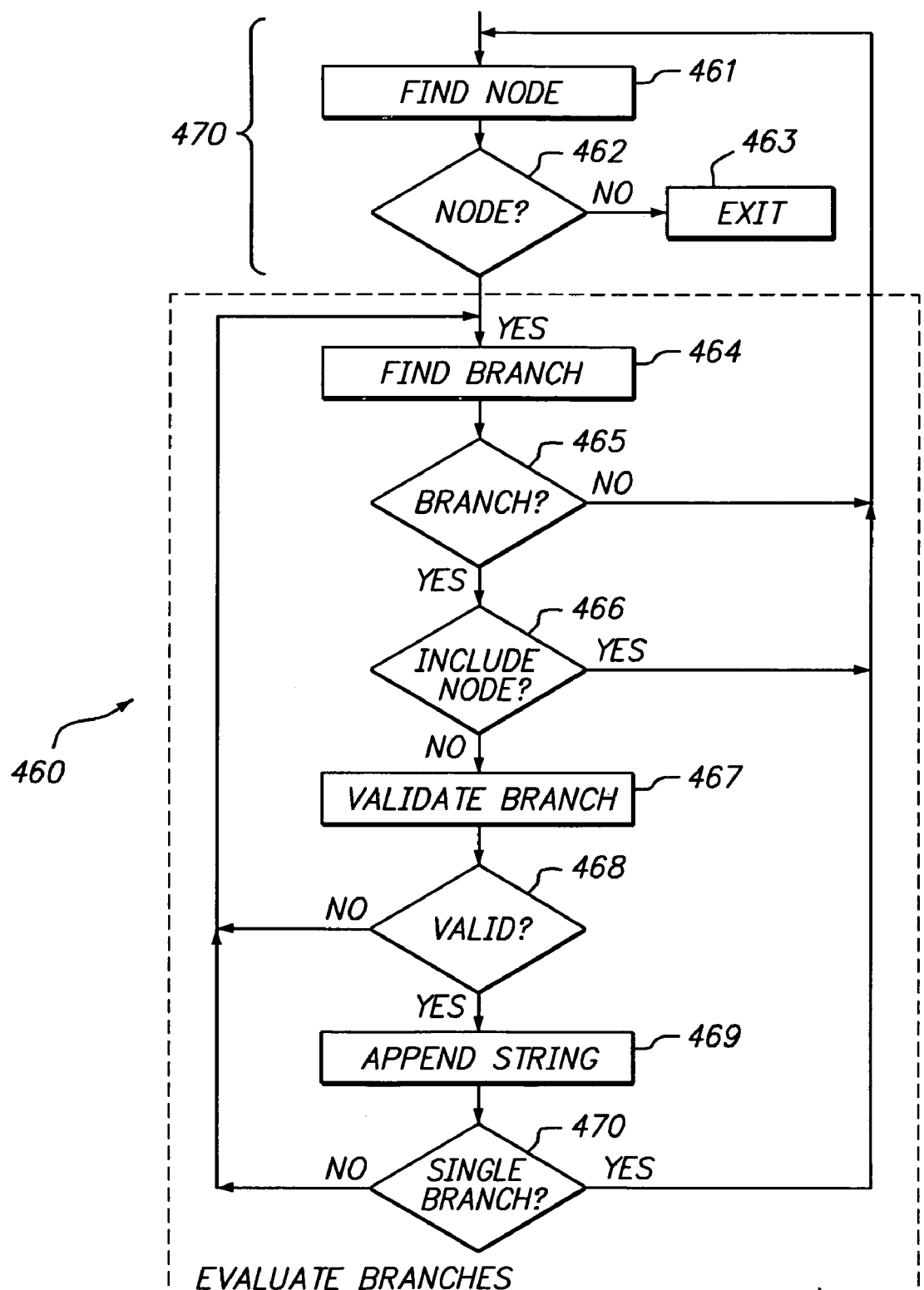
FIG. 4E is a process flow diagram of a linear command regeneration method that is stored in a memory for execution by the processor of FIG. 2A and FIG. 2B.

FIG. 4E illustrates one embodiment of a configuration command regeneration process 460 that is used to regenerate a configuration command using the command reconfiguration template. A more detailed embodiment is described below with respect to FIG. 11 and FIG. 12. To illustrate process 460 assume that command TEST, as described above, was TEST AA abcd.

Thus, in system configuration database 260, argument ten is AA, argument one is undefined, and argument two is string abcd. Linear command regeneration template 270 is given in TABLE 3.

Find node operation 461 scans linear command regeneration template 270 to find a linear node. As explained above, linear node 451 is delimited by the begin option node template with identification ID1 and the end option node template with identification ID1. (See TABLE 3.) Thus, find node operation 461 finds:

{B, 2, S, ID1, 0} AA, <10, AA> {N, ID1}
BB, <10, BB> {N, ID1} {E, ID1}

This string is cut from template 270 and passed to find branch operation 464 through linear node found check operation 462.

In find branch operation 464, the first path, e.g.,

AA, <10, AA>, is found between the right brace of the begin option node template and the left brace of the first next option template with identification ID1, and becomes the current branch. Since a branch was found, branch found check operation 465 transfers to include linear node check operation 466.

In linear node check operation 466, the current branch is scanned to determine whether the branch includes a begin option node template. If a begin option node template is found in the current branch, check operation 466 returns to find node operation 461 to locate the linear node within the current branch. Otherwise, check operation 466 transfers to validate branch operation 467.

In validate branch operation 467, the data in argument ten in system configuration database 260 is compared with the value assigned to argument ten by the current branch. In this example, the value for both is AA and so the current branch is valid. Consequently, valid check operation 468 transfers to append string operation 469.

In append string operation 469, the evaluated current branch is appended to a configuration command string, which after operation 469 is:

TEST AA.

Upon completion of append string operation 469, single branch check operation 470 determines whether parameter flags in the current begin option node template is set to single. In this example, parameter flags is single, and so branch check operation 470 transfers to find node operation 461. If parameter flags is other than single, check operation 470 transfers to find branch operation 464, and operations 464 to 470 are repeated for the next branch as appropriate.

Upon returning to operation 461, find node operation 461 scans the remainder of linear command regeneration template 270 to find another linear node. As explained above, linear node 452 is delimited by the begin option node template with identification ID2 and the end option node template with identification ID2. (See TABLE 3.) Thus, find node operation 461 finds:

(B, 2, S, ID2, 0}<n>, <1,<n>> {N, ID2}
string, <2, string> {N, ID2} {E, ID2}

This string is cut from template 270 and passed to find branch operation 464 through linear node found check operation 462.

In find branch operation 464, the first path, e.g.,

<n>, <1,<n>>, is found between the right brace of the begin option node template and the left brace of the first next option template with identification ID2, and becomes the current branch. Since a branch was found, branch found check operation 465 transfers to include linear node check operation 466.

In linear node check operation 466, the current branch is scanned to determine whether the branch includes a begin option node template. Check operation 466 transfers to validate branch operation 467.

In validate branch operation 467, the data in argument one in system configuration database 260 is compared with the value assigned to argument one by the current branch. In this example, the value for argument one in the database 260 is invalid and so this branch is not valid. Consequently, valid check operation 468 transfers to find branch operation 464.

In find branch operation 464, the second path, e.g., string, <2, string>, is found between the right brace of the first next option node template and the left brace of the second next option template with identification ID2, and becomes the current branch. Since a branch was found, branch found check operation 465 transfers to include linear node check operation 466.

In linear node check operation 466, the current branch is scanned to determine whether the branch includes a begin option node template. Check operation 466 transfers to validate branch operation 467.

In validate branch operation 467, the data in argument two in system configuration database 260 is compared with the value assigned to argument two by the current branch. In this example, the value for argument two in the current branch is a string. Consequently, valid check operation 468 transfers to append string operation 469.

In append string operation 469, the evaluated current branch is appended to a configuration command string, which after operation 469 is:

TEST AA abcd.

Upon completion of append string operation 469, single branch check operation 470 determines whether parameter flags in the current begin option node template is set to single. In this example, parameter flags is single, and so branch check operation 470 transfers to find node operation 461.

Find node operation 461 fails to find another linear node. Consequently, node check operation 462 transfers to exit operation 463 that cleans up memory, and returns the regenerated configuration command.

In summary, the linear command regeneration process 460 includes two primary operations. First, a linear command regeneration template is scanned to find a linear node in locate linear node operation 470. (FIG. 4E.) When a linear node is found, each branch in the linear command regeneration template for that linear node is evaluated if appropriate, and if valid, the evaluated branch is appended to a regenerated command string in valuate branches operation 471.

The linear nodes are implemented within a conventional parser and place data on a parsing stack in conventional manner. Consequently, herein only the features required to add the linear nodes to the conventional parser are described. The particular implementation of the parser that utilizes the linear nodes is not critical. Hence, one embodiment of each of begin option node, next option node and end option node are considered in further detail.

TABLE 5 is pseudo code for begin option node handling logic during parsing of user inputs

TABLE 5

```
Beginoption {
    Get the option ID, and check if this is the first encounter
        by trying to locate it on the option stack.
    If new
        create item on option stack
        push endoption node on parsing stack, increment end
            count
        iterate all branches and push all to parsing stack in
            reverse order
    else
        if "generic array"
            push endoption node
            increment end count
            increment the global argument increment offset
```

TABLE 5-continued

```
            if match count still smaller than total array
                    element count
                push the branch
        else if "single"
            push endoption node on parsing stack
            exit function
        else if "combo"
            push endoption node
            increment end count
            push all unmatched branches' start nodes in
                reverse order
        else (i.e. "all")
            if all branches have matched
                push endoption node
            increment end count
        else
            push all unmatched branches' start nodes in
                reverse order
}
```

Figure 5:
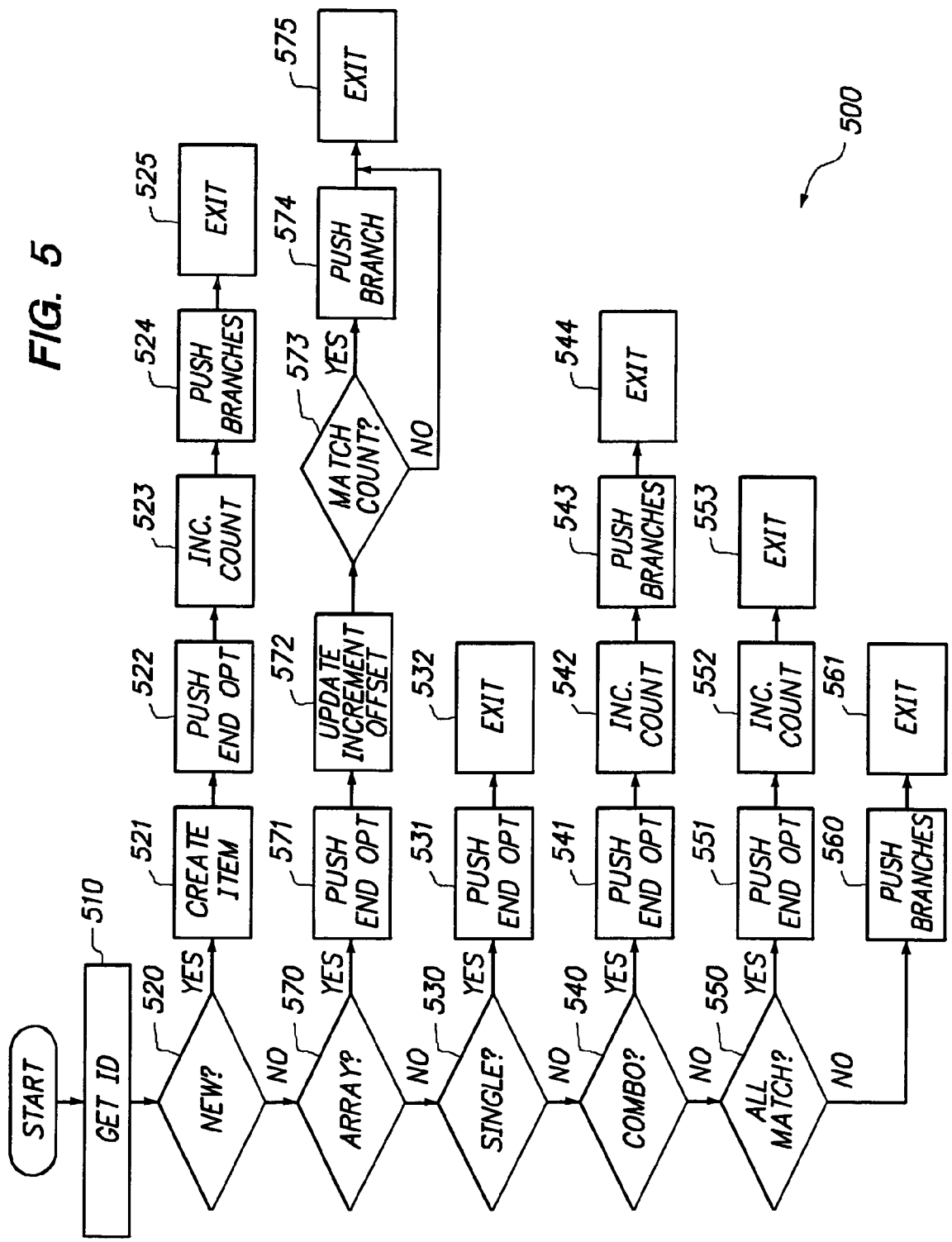
FIG. 5 is a process flow diagram of a begin option node method that is stored in a memory for execution by the processor of FIG. 2A and FIG. 2B.

FIG. 5 is a process flow diagram 500 for the embodiment of a begin option node presented in TABLE 5. Upon entry to begin option node method 500, get identification operation 510 obtains an option identification that uniquely identifies the offset position of the end option node in the parse tree. Operation 510 transfers to new check operation 520.

In new check operation 520, an option stack is accessed to determine whether the option identification obtained in operation 510 is on the option stack. If the option identification is on the option stack, the begin option node is not new. Conversely, if the option identification is not on the stack, the begin option node is new. If the begin option node is new, check operation 520 transfers to create item operation 521, and otherwise to array check operation 570.

In create item operation 521, a matched branch list 311 (FIG. 3) in the begin option node is set to null. A next pointer for the begin option node is set equal to a pointer to the top of the option stack, and flags associated with a bypass, e.g., has a bypass and ignore bypass, are set to false. Operation 521 transfers to push end option operation 522.

Push end option operation 522 places an end option node on the parsing stack while increment count operation 523 increments an end counter. Push branches operation 524 iterates through the branches of the new begin option node, starting with the last branch, and pushes each branch on the parsing stack. Specifically, this pushes the first node of each branch on the parsing stack. A pointer is maintained to the next branch associated with the begin option node. Finally, operation 524 goes to exit 525, which terminates processing method 500 at this time.

Figure 6:
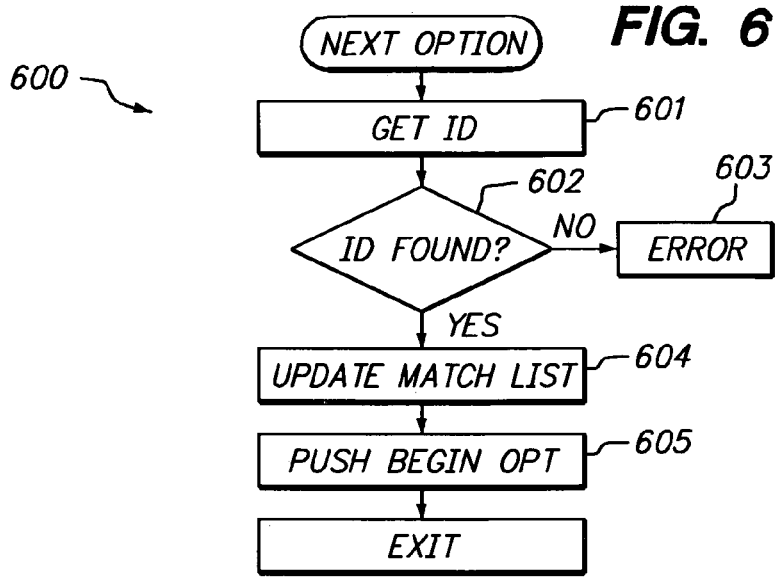
FIG. 6 is one embodiment of a process flow diagram of a next option node that is stored in a memory for execution by the processor of FIG. 2A and FIG. 2B.

The parser pops the first node of each branch in turn off the parsing stack and tests to determine whether the branch condition is true. In the normal parsing fashion, the parser tries to parse the nodes in a branch successively. If the parse chain for a branch is parsed successfully, the last token in the branch that is processed is next option node method 600 (FIG. 6). TABLE 6 is pseudo code for one embodiment of next option node method 600.

TABLE 6

```
Nextoption {
    get the option ID (can't find => error)
    add the current branch ID into the matched branch list of
        current option ID
```

TABLE 6-continued

```
     push the corresponding beginoption node into the parsing
           stack
}
```

In method 600 (FIG. 6), get ID operation 601 obtains the option ID for the begin option node containing the matched branch. This makes the option ID the current item on the option stack, i.e., the current option ID. Get ID operation 601 transfers to ID found check operation 602.

If the option ID cannot be found, check operation 602 transfers to error operation 603, which in turn generates an error message. If the option ID is found, found check operation 602 transfers processing to update match list operation 604.

In update match list operation 604, the branch ID for the matched branch is written to matched branch list 311 for the current option ID, and processing transfers to push begin option operation 605. In push begin option operation 605, the begin option node for the current option ID is pushed on the parsing stack, and method 600 is exited.

Upon return to method 500, get identification operation 510 obtains an option identification that uniquely identifies the offset position of the end option node in the parse tree. Operation 510 transfers to new check operation 520.

In new check operation 520, the option stack is accessed to determine whether the option identification is on the option stack. Since the option identification is on the option stack, check operation 520 transfers to array check operation 570.

At this point, the actions taken depends upon the value of parameter flags for the begin option node. Each value of parameter flags and the resulting action is considered in turn. Array check operation 570 determines whether parameter flags is set to generic array. If parameter flags is set to generic array, processing transfers to push end option node operation 571 and otherwise to single check operation 530.

Push end option node operation 571 pushes the end option node on the parsing stack and transfers to update increment offset operation 572. In increment offset operation 572, a global argument increment offset is incremented. The combination of the current option ID and the global argument increment offset are used to address the option stack as a random access memory. Upon completion, operation 572 transfers to match count check operation 573.

If the count of matched branches is smaller than the total array element count, match count check operation 573 transfers to push branch operation 574 and otherwise to exit 575. In push branch operation 574, the branch is pushed on the parsing stack and operation 574 transfers to exit 575.

Returning to FIG. 5 for begin option node 500, and assuming that parameter flags is set to single, processing transfers through new check operation 520, and array check operation 570 to single check operation 530. Since parameter flags is set to single, check operation 530 transfers to push end operation 531.

Push end node operation 531 pushes the end option node on the parsing stack and method 500 exits through exit 532.

Figure 7:
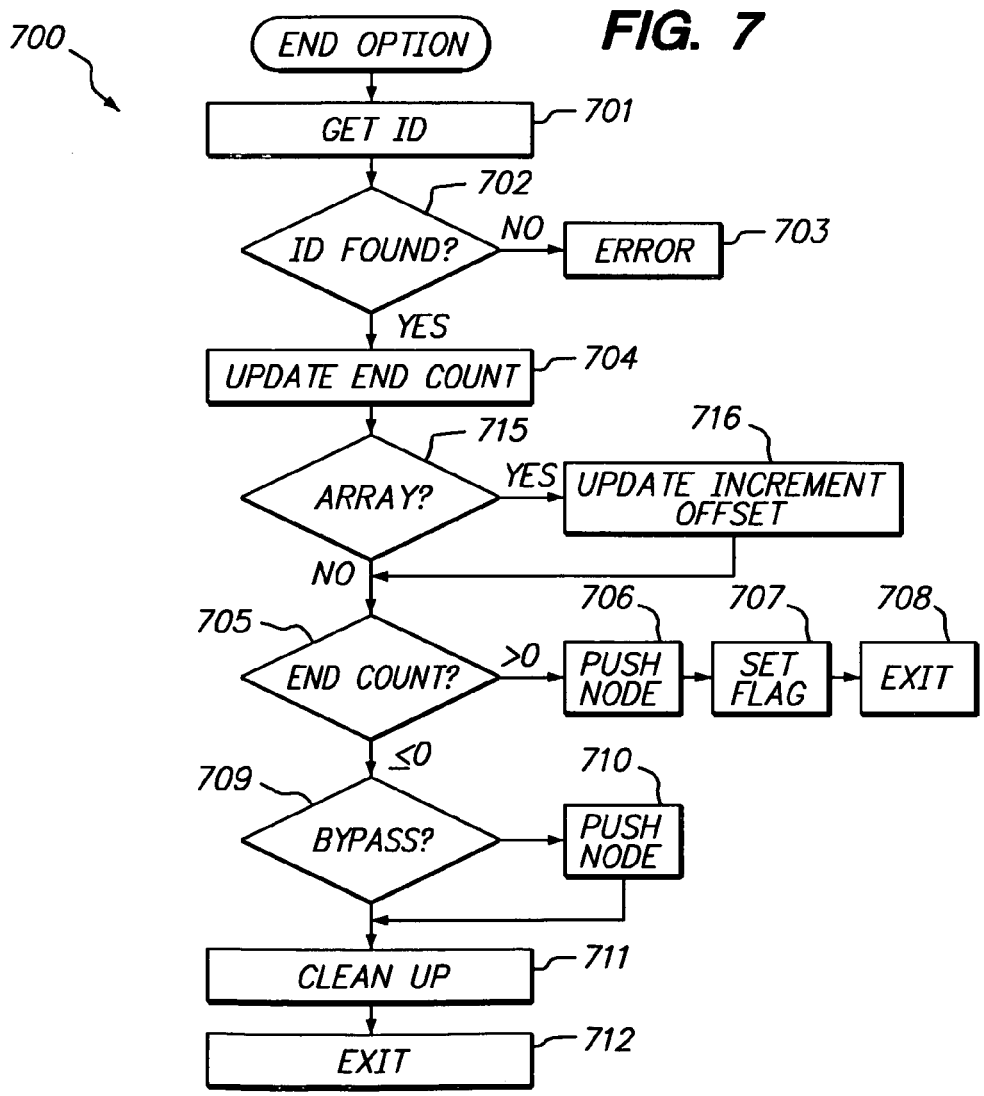
FIG. 7 is one embodiment of a process flow diagram of an end option node method that is stored in a memory for execution by the processor of FIG. 2A and FIG. 2B.

When the parser pops the end option node off the parsing stack, end option node method 700 (FIG. 7) is executed. TABLE 7 is pseudo code for one embodiment of end option node method 700.

TABLE 7

```
Endoption {
    get the option ID (can't find => error)
    decrement the end count
    If "generic array"
        Reset global argument increment offset to zero
    If end count > 0
        push the next parsing node to parsing stack
        set ignore bypass flag
    else
        if (bypass) and not (ignore bypass)
            push the next parsing node to parsing stack
        endif
        clean up option stack (pop and free memory)
}
```

In method 700, get ID operation 701 obtains the option ID for the begin option node containing the matched branch. This makes the option ID the current item on the option stack, i.e., the current option ID. Get ID operation 701 transfers to ID found check operation 702.

If the option ID cannot be found, check operation 702 transfers to error operation 703, which in turn generates an error message. If the option ID is found, found check operation 702 transfers processing to update end count operation 704.

In update end count operation 704, the end count is decremented and processing transfers to array check operation 715. If parameter flags is set to generic array, check operation transfers to update increment offset operation 716, and otherwise to end count check operation 705. Update increment offset operation 716 resets the global argument increment offset to zero and transfers to end count check operation 705. If the end count is greater than zero, end count check operation 705 transfers to push node operation 706.

Push node operation 706 pushes the next parsing node to the parsing stack and transfers to set flag operation 707. Set flag operation 707 sets the ignore bypass flag for the begin option node with the current ID, and exits end option node method 700 via exit 708.

If the end count is zero, end count check operation 705 transfers to bypass check operation 709. Bypass check operation 709 determines whether the bypass flag is true and the ignore bypass flag is false. If the bypass flag is true and the ignore bypass flag is false, check operation 709 transfers to push node operation 710 and otherwise to clean-up operation 711.

Push node operation 710 pushes the next parsing node to the parsing stack and transfers to clean-up operation 711. Clean-up operation 711 cleans up the option stack, frees memory, and exits end option node method 700 via exit 712.

Returning to FIG. 5 for begin option node 500, and assuming that parameter flags is set to combo, processing transfers through new check operation 520, array check operation 570, and single check operation 530, to combo check operation 540. Since parameter flags is set to combo, check operation 540 transfers to push end operation 541.

Push end option operation 541 places an end option node on the parsing stack while increment count operation 542 increments the end counter. Push branches 543 iterates through the branches of the begin option node, starting with the last branch, and pushes all unmatched branch, i.e., all branches not in matched branch list 311, on the parsing stack. Finally, operation 543 goes to exit 544, which terminates processing method 500 at this time.

Returning to FIG. 5 for begin option node 500, and assuming that parameter flags is set to all, processing transfers through new check operation 520, array check operation 570, single check operation 530, and combo check operation 540 to all match check operation 550. Since parameter flags is set to all, all match check operation 550 determines whether all branches have been matched. (Note that all the branches are pushed just once. Therefore, each branch is popped and processed just once.) If all branches have been matched, check operation 550 transfers to push end option node operation 551, and otherwise to push branches operation 560.

Push end option node operation 551 places an end option node on the parsing stack while increment count operation 552 increments the end counter. Finally, operation 552 goes to exit 553, which terminates processing method 500 at this time.

Push branches 560 iterates through the branches of the begin option node and starting with the last branch pushes all unmatched branch, i.e., all branches not in matched branch list 311, on the parsing stack. Processing exits through exit 561.

In addition, to parsing the configuration command, as described above, the parser writes a linear command regeneration template 270 to file 271 if the configuration command segment, beginning with a begin option node and ending with an end option node, is well behaved. A configuration command segment is well behaved if:

1. Each branch is unique in a way that each branch causes either a different argument to be set, or a different value to be set to an argument; and
2. There cannot be an end command or a sub mode inside a branch.

If a configuration command segment is not well behaved, the prior art method of writing a line for each path through the parse tree is used.

If the configuration command segment is well behaved, linear command regeneration template is generated as described below. TABLE 8 is pseudo code for begin option node template generation during parsing.

TABLE 8

```
Beginoption {
    Get the option ID
    Check if this is the first encounter by trying to locate it
        on the option stack.
    If new
        create item on option stack
        push endoption node to parsing stack
        increment end count
        print beginoption template mark with all necessary
            details such as number of branches, bypass, type,
            ID, etc.
        push first branch to parsing stack
    else
        if "generic array"
            count number of time the branch has been pushed
            if this number < array count
                push branch to parsing stack
            else (i.e. the branch has been pushed enough
                times)
                push endoption node to parsing stack
                increment end count
        else
            find next unpushed branch
            if found
                push this branch to parsing stack
```

TABLE 8-continued

```
        else (i.e. all branches have been pushed)
            push endoption node to parsing stack
            increment end count
}
```

Figure 8:
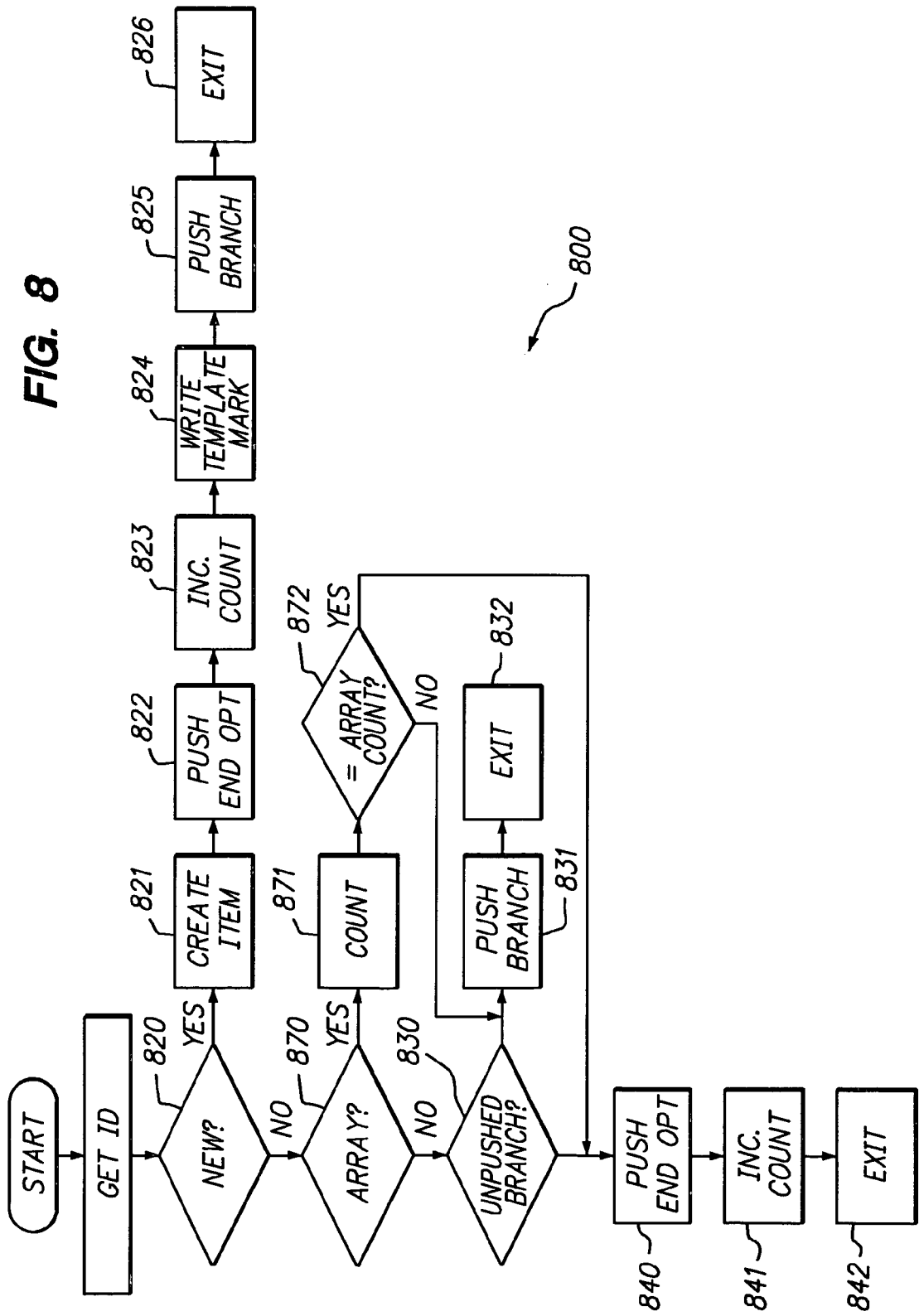
FIG. 8 is one embodiment of a process flow diagram of a begin option node template generation method that is stored in a memory for execution by the processor of FIG. 2A and FIG. 2B.

FIG. 8 is a process flow diagram 800 for one embodiment of a begin option node template generation presented in TABLE 8. Upon entry to begin option node template generation process 800, get identification operation 810 obtains an option identification that uniquely identifies the offset position of the end option node in the parse tree. Operation 810 transfers to new check operation 820.

In new check operation 820, the option stack is accessed to determine whether the option identification is on the option stack. If the option identification is on the option stack, the begin option node is not new. Conversely, if the option identification is not on the option stack, the begin option node is new. If the begin option node is new, check operation 820 transfers to create item operation 821, and otherwise to array check operation 870.

Create item operation 821 is similar to create item operation 521 (FIG. 5), and that description is incorporated herein by reference. However, in operation 821, the pushing is done as when parameter flags is set to all, irrespective of what the value of parameter flags actually is. Operation 821 transfers to push end option operation 822.

Push end option operation 822 places an end option node on the parsing stack while increment count operation 823 increments an end counter. Increment count operation 823 transfers to write template mark operation 824.

Write template mark operation 824 write a begin option template mark with all the necessary details. For this description, assume that the configuration command is:

TEST AA.

For this example, write template mark operation 824 writes

TEST {B, S, 2, 0x1, 0} using the template described above. Operation 824 transfers to push branch operation 825, which in turn pushes the first branch for configuration command TEST on the parsing stack and process 800 is exited through exit 826.

When the parser pops the first branch off the parsing stack, a template for the branch is written to linear command regeneration template 270, which is this example is after this write:

TEST {B, S, 2, 0x1, 0} AA<10, AA>

Figure 9:
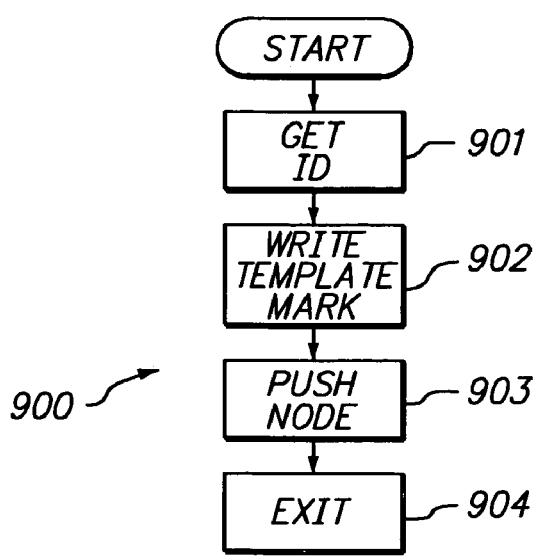
FIG. 9 is one embodiment of a process flow diagram of a next option node template generation method that is stored in a memory for execution by the processor of FIG. 2A and FIG. 2B.

After the first branch is processed, the next option node template generation method 900 (FIG. 9) is executed.

TABLE 9 is pseudo code for one embodiment of next option node template generation method 900.

TABLE 9

```
Nextoption {
    Locate current ID on option stack
    Print next option node template mark
    Push corresponding begin option node on parsing stack
}
```

In method 900, get ID operation 901 obtains the option ID for the next option node on the option stack, i.e., the current option ID. Get ID operation 901 transfers to write next option node template operation 902.

In write next option node template operation 902, a next option node template is written to linear command regeneration template 270 and so after this write, linear command regeneration template 270 is:

TEST {B, S, 2, 0x1, 0} AA <10, AA> {N, 0x1}.

Operation 902 transfers to push node operation 903 which in turn pushes the begin option node for the current option ID on the parsing stack, and method 900 is exited.

Upon return to method 800, get identification operation 810 obtains an option identification that uniquely identifies the offset position of the end option node in the parse tree. Operation 810 transfers to new check operation 820.

In new check operation 820, the option stack is accessed to determine whether the option identification is on the option stack. Since the option identification is on the option stack, check operation 820 transfers to array check operation 870.

In this example, a generic array is not being used and so array check operation 807 transfers to unpushed branch check operation 830. However, prior to considering the action associated with operation 830, the actions in template generation for a generic array are described. If parameter flags is set to generic array, array check operation 870 transfers processing to count operation 871.

Count operation 871 counts the number of times the branch associated with the begin option node has been pushed on the parsing stack and transfers to equals array count check operation 872. If the number of times is less than the array count, i.e., the size of the array, check operation 872 transfers to push branch operation 831 that is described below. Conversely if the number of times is equal to the array count, the array has been processed and so check operation 872 transfers to push end option operation 840 that is described below.

Returning to the example, and entry to unpushed branch check operation 830, at this point, the actions taken depends upon whether there is another branch that has not processed for the begin option node. Since in the example, there is an additional branch, unpushed branch check operation 830 finds an unpushed branch and so transfers to push branch operation 831. Push branch operation 831 in turn pushes the second branch for configuration command TEST on the parsing stack and process 800 is exited through exit 832.

When the parser pops the second branch off the parsing stack, a template for the second branch is written to linear command regeneration template 270, which is in this example after this write:

TEST {B,S,2,0x1,0} AA <10,AA> {N,0x1} BB <10,BB>

After the second branch is processed, the next option node template generation method 900 (FIG. 9) is executed as described above and so linear command regeneration template 270 becomes:

TEST {B,S,2,0x1,0} AA <10,AA> {N,0x1} BB <10,BB> {N,0x1}.

Push node operation 903 again pushes the begin option node for the current option ID on the parsing stack, and method 900 is exited.

Upon return to method 800, get identification operation 810 again obtains an option identification that uniquely identifies the offset position of the end option node in the parse tree. Operation 810 transfers to new check operation 820.

In new check operation 820, the option stack is accessed to determine whether the option identification is on the option stack. Since the option identification is on the option stack, check operation 820 transfers through array check operation 870 to unpushed branch check operation 830.

Since in the example, there are no additional branches, unpushed branch check operation 830 does not find an unpushed branch and so transfers to push end option operation 840.

Push end option operation 840 places an end option node on the parsing stack while increment count operation 841 increments an end counter. Method 800 is exited through exit 842.

Figure 10:
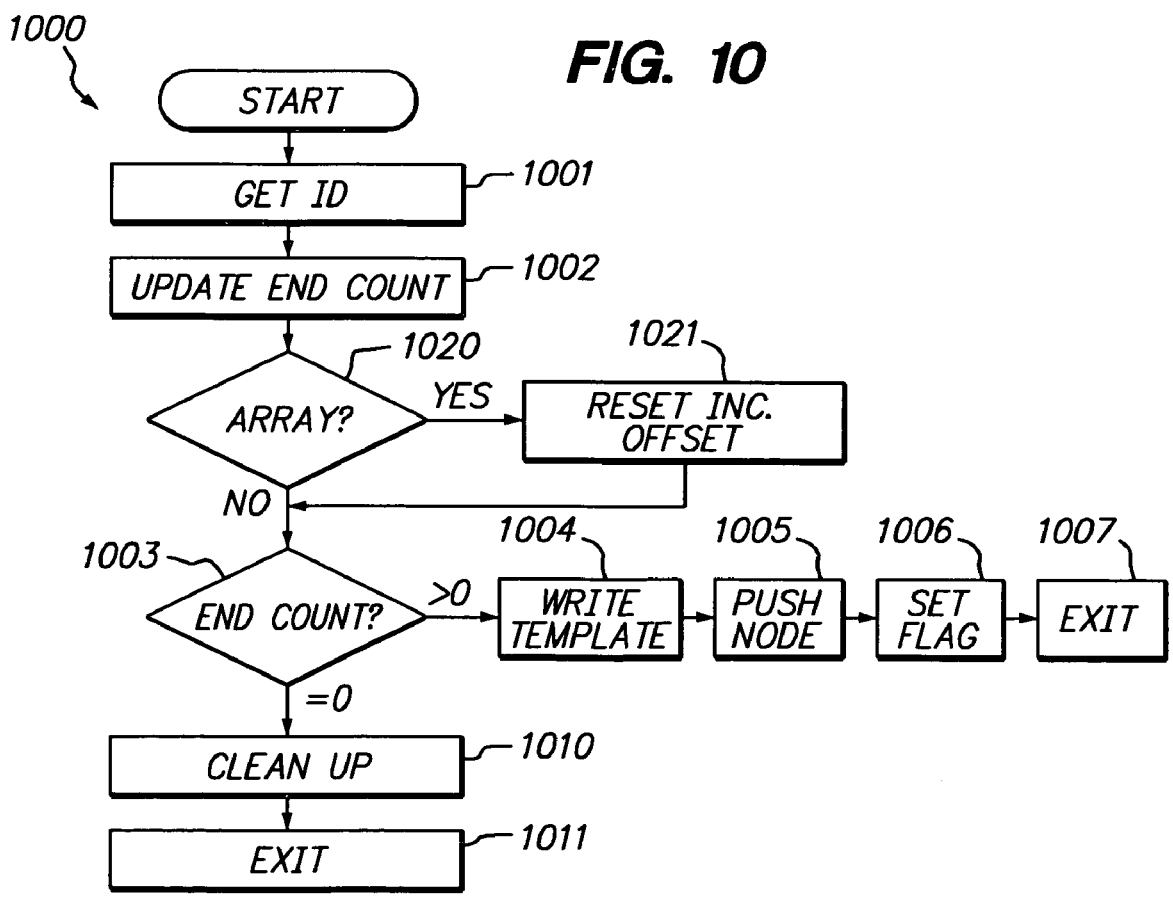
FIG. 10 is one embodiment of a process flow diagram of an end option node template generation method that is stored in a memory for execution by the processor of FIG. 2A and FIG. 2B.

When the end option node is popped off the parsing stack, end option node template generation method 1000 (FIG. 10) is executed. TABLE 10 is pseudo code for one embodiment of end option node template generation method 1000.

TABLE 10

Endoption {
    Locate current ID on option stack
    decrement end count
    if "generic array"
        reset global argument increment offset to 0
    if end_count > 0
        print endoption template mark
        push next parsing node to parsing stack
        set ignore bypass
    else
        clean up option stack
}

In method 1000, get ID operation 1001 obtains the option ID, i.e., the current option ID, from the option stack. Get ID operation 1001 transfers to update end count operation 1002. In operation 1002, the end count is decremented and processing transfers to array check operation 1020.

If parameter flags is set to generic array, array check operation transfers to reset increment offset operation 1021 and otherwise to end count check operation 1003. In reset increment offset operation 1021 the global argument increment offset is set to zero and processing transfers to end count check operation 1003.

If the end count is greater than zero, end count check operation 1003 transfers to write end option template operation 1004. Note the end option node is pushed once when the begin option node is processed for the first time, before any branches are processed. After all the branches have been processed, control reverts back to the begin option node, and the end option node is pushed for a second time.

End option template operation 1004 writes an end option node template to linear command regeneration template 270. After this write, linear command regeneration template 270 is:

TEST {B,S,2,0x1,0} AA <10,AA> {N,0x1} BB <10,BB> {N,0x1} {E,0x1}

Operation 1004 transfers to push node operation 1005, which in turn pushes the next parsing node to the parsing stack and transfers to set flag operation 1006. Set flag operation 1006 sets the ignore bypass flag for the begin option node with the current ID, and exits end option node template generation method via exit 1007. However, during template generation processing, the bypass flag is always ignored.

If the end count is zero, end count check operation 1003 transfers to clean-up operation 1010. Clean-up operation 1010 cleans up the option stack, frees memory, and exits end option node template generation method 1000 via exit 1011.

To regenerate a configuration command using linear command regeneration template 270, two functions are used in this embodiment. A first locates the start and end of a linear node, and then passes the linear node to a second function that determines which of the branches in the linear node is valid. Any valid branches are returned to the first function and are pasted into linear command regeneration template 270. As explained more completely below, for the above example, the two functions process the template string (assuming arg(10) is set to "AA"):

TEST {B,S,2,0x1,0} AA <10,AA> {N,0x1} BB <10,BB> {N,0x1} {E,0x1} to yield

TEST AA

TABLE 11 is pseudo code for one embodiment of the first function, a filter option function.

TABLE 11

```
Filter_option {
Note: this function scans the template string for begin option
node constructs, and passes each of them to Pick_option_path for
branch resolution. The call can be recursive if there are nested
options.
    repeatedly scan for begin option node template, if not
        found, then exit
    extract ID
    scan template for endoption mark with the ID (not found =>
        error)
    cut the option construct (from begin mark to end mark)
    pass cut option construct to Pick_option_path( ) for
        processing
    paste the result from Pick_option_path( ) back into the
        template, replacing the cut option construct
}
```

Figure 11:
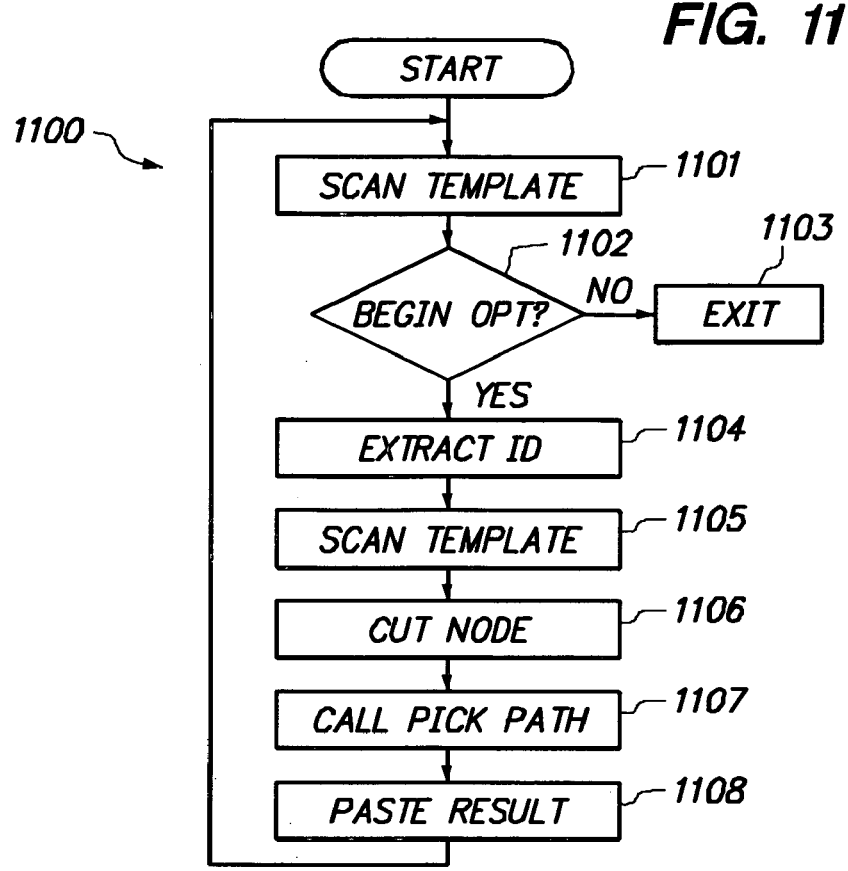
FIG. 11 is a process flow diagram of one embodiment of a filter option method.
Figure 12:
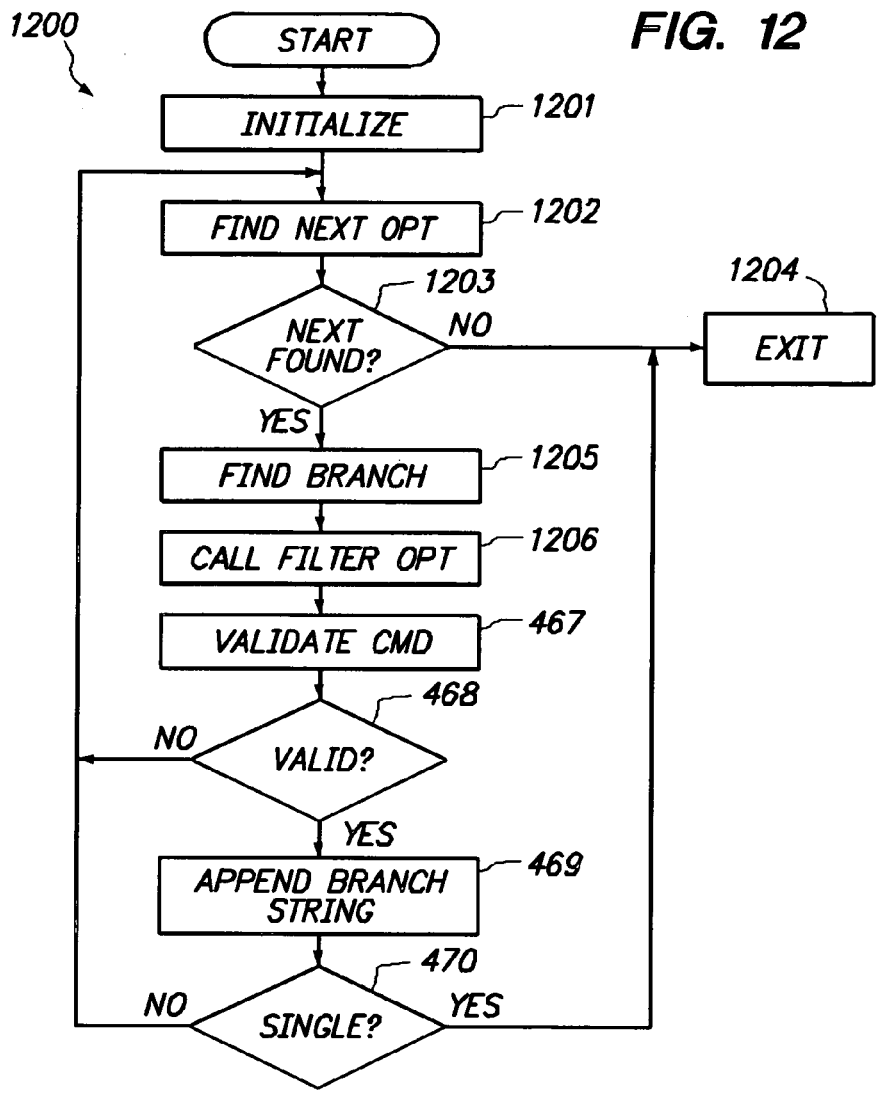
FIG. 12 is a process flow diagram of one embodiment of a pick option path method.

FIG. 11 is a process flow diagram for one embodiment of filter option method 1100. In scan template operation 1101, linear command regeneration template 270 is scanned to locate a begin option node template. If a begin option node template is found, begin option check operation 1102 transfers to extract identification operation 1104, and otherwise to exit 1103.

In extract identification operation 1104, the identification in the begin option node is extracted and then scan template operation 1105, scans linear command regeneration template 270 to locate an end option node with the same identification. After locating the end option node, cut node operation 1106 cuts a template for the linear node ("linear node template") as defined by the begin option node and the end option node from linear command regeneration template 270. The linear node template is passed to the second function, a pick option path method 1200 in call pick path operation 1107. TABLE 12 is pseudo code for one embodiment of pick option path method 1200.

TABLE 12

```
Pick_option_path {
Note: this function looks at each branch of the option construct
received as input, and validates/invalidates it depending on:
    1. arguments stored in memory/not present and/or
    2. values set in arguments match/not match the value on
       template
If it sees another begin option mark, Filter_option( ) is called
again.
initialize return string to null
repeatedly scan for nextoption marks for current ID, exit when
    not found
    find the beginning and end of current branch
    call Filter_option( ) with this branch string
    call validate command with the processed string (find any
        unsubstituted arguments and/or any inconsistent set
        values)
```

TABLE 12-continued

```
    if validated
        append processed branch string to return string
        if type is "single"
            break and exit
        else
            continue
}
```

In pick option path method 1200, initialize operation 1201 sets the return string to null and transfers to find next option node operation 1202. If a next option node with the current identification is found, processing transfers through next found check operation 1203 to find branch 1205, and otherwise to exit 1204.

In find branch 1205, the branch string between the right and left braces of the non-end node templates with the current identification is extracted. To determine whether another linear node is embedded within the current linear node, the branch string is passed to filter option method 1100 in call filter option operation 1206. If filter option operation 1206 finds an embedded linear node that node is processed. Otherwise, processing transfers to validate command operation 467.

In validate command operation 467, the branch string is evaluated with the stored data, and valid check operation 468 determines whether the branch string generated the stored data. If the branch string is validated, valid check operation transfers to append branch string operation 469, and otherwise to find next option operation 1202.

In append branch string operation 469, the validated branch string is appended to the return string, and processing transfers to single type check operation 470. If the begin option node with the current identification has parameter flags set to single, check operation 470 transfers to exit operation 1204, and otherwise to find next option operation 1202 in which case, operations 1202 to 1206 and 467 to 470 are repeated as appropriate.

The linear nodes can be utilized to represent a wide variety of programming structures in a linear parse tree, such that the linear command regeneration template can be utilized and so obtain the advantages described above. For example, consider a common programming construct, namely an if-then-else control structure of the form presented in Table 13. This if control structure can be derived using a linear node structure.

TABLE 13

```
if (a)
    then (b)
    else (c)
endif
```

A linear node, in general, is used to represent an if control structure by: a) starting a new begin option node when an if statement is encountered; b) using a new then node, as described more completely below, to represent the then statement; c) mapping the else statement to two nodes: a next option node, followed by a new else node to start a new branch of the linear node; and d) mapping the endif statement to a next option node followed by an end option node.

Figure 13:
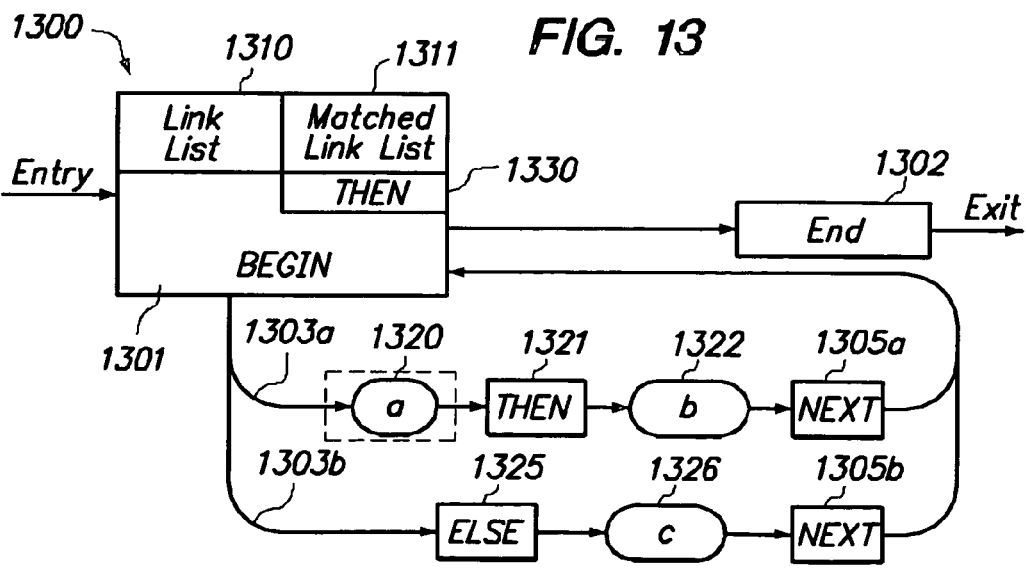
FIG. 13 is a diagram of the linear node structure for a first embodiment of an "if" control structure.

FIG. 13 is a diagram of the linear node structure for the if control structure of Table 13. Begin option node 1301 in linear node structure 1300 is generated for the if statement. Link list 1310 and matched link list 1311 are equivalent to link list 310 and matched link list 311 that were described above. Parameter flags for begin option node 1301 is set to single. In addition, in this embodiment, begin option node 1301 includes a then flag 1330 that is initialized to a first state, e.g., cleared.

For the if control structure of Table 13, linear node structure 1300 has two branches 1303a and 1303b. Each branch is executed in sequence starting with branch 1303a.

In branch 1303a, operation 1301 tests for "A". If "A" is true, processing transfers to then node 1321 in branch 1303a, and otherwise processing of branch 1303a terminates. If processing transfers to then node 1321, then node 1331 changes the state of then flag 1330 in begin option node 1301, e.g., sets then flag 1330 and transfers to operation 1322 that, in turn, takes action "B" and transfers to next option node 1305a that adds the current branch ID to matched branch list 1311 in begin option node 1301. Next option node 1305a transfers processing to begin option node 1330, which in turn transfers to end option node 1302.

Note that it is possible that action "B" may not complete successfully, and so next option node 1305a would not be reached. The setting of then flag 1330 assures that branch 1303b, the else branch, is not executed when the test on "A" is true.

When execution of second branch 1303b is started, else node 1325 tests then flag 1330 in begin option node 1301 to determine whether flag 1330 is in the second state. If then flag 1330 is in the second state, processing in branch 1303b terminates. Conversely, if then flag 1330 is in the first state, else node 1325 transfers to operation 1326. Operation 1326 performs action "C" and transfers to next option node 1305b that adds branch 1303b to the matched branch list 1311. Begin option node 1301 transfers processing to end option node 1302.

The if, then, else structure of Table 13 is easily extended to include elseif statements as presented, for example, in Table 14.

TABLE 14

```
if (A)
    then (B)
    elseif (C)
        then (D)
    .
    .
    .
    elseif ((N−1))
        then (N)
        else ((N+1))
endif
```

Figure 14:
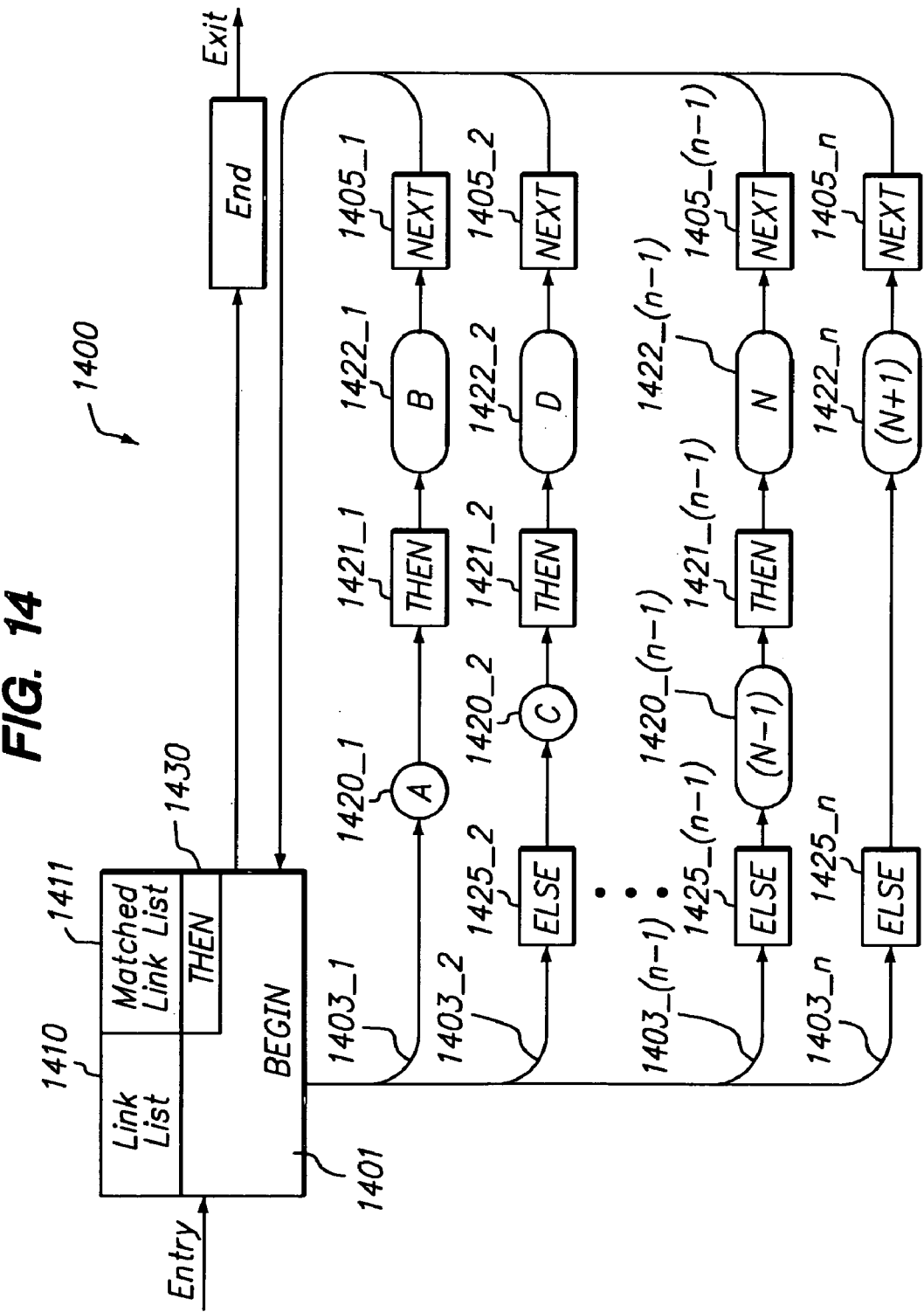
FIG. 14 is a diagram of the linear node structure for a second embodiment of an "if" control structure.

FIG. 14 is a diagram of the linear node structure of this invention for the if control structure of Table 14. Begin option node 1401 in linear node structure 1400 is generated for the if statement. Structure 1400 is stored in a memory. Link list 1410 and matched link list 1411 are equivalent to link list 310 and matched link list 311 that were described above. Parameter flags for begin option node 1401 is set to single. In addition, in this embodiment, begin option node 1401 includes a then flag 1430 that is initialized to the first state, e.g., cleared.

For the if control structure of Table 14, linear node structure 1400 has a plurality of branches 1403_1 to 1403_n. Each branch is executed in sequence starting with branch 1403_1.

In branch 1403_1, operation 1420_1 tests for "A". If "A" is true, processing transfers to then node 1421_1 in branch 1403_1, and otherwise processing of branch 1403_1 terminates. If processing transfers to then node 1421_1, then node 1421_1 changes the state of the then flag in begin option node 1401, e.g., sets then flag 1430. Node 1421_1 transfers to operation 1422_1 that, in turn, takes action "B" and transfers to next option node 1405_1. Next option node 1405_1 adds the current branch ID to matched branch list 1411 in begin option node 1401 and transfers to begin option node 1401, which in turn transfers to end option node 1402.

When execution of second branch 1403_2 is started, else node 1425_2 tests then flag 1330 in begin option node 1401 to determine whether flag 1430 is in the second state. If then flag 1430 is in the second state, processing in branch 1403_2 terminates. Conversely, if then flag 1430 is in the first state, else node 1425_2 transfers to operation 1420_2.

Operation 1420_2 tests for "C". If "C" is true, processing transfers to then node 1421_2 in branch 1403_2, and otherwise processing of branch 1403_2 terminates. If processing transfers to then node 1421_2, then node 1421_2 changes the state of the then flag in begin option node 1401, e.g., sets then flag 1430. Then node 1421_2 transfers to operation 1422_2 that, in turn, takes action "D" and transfers to next option node 1405_2 that adds the current branch ID to matched branch list 1411 in begin option node 1401 and transfers to begin option node 1401, which in turn transfers to end option node 1402.

Processing of each branch in turn continues until one branch is satisfied. If processing reaches branch 1403_n, action (n+1) is taken and processing transfers to next node 1405_n, which in turn returns to begin option node 1401.

In the above example only single if control structures where considered. However, since the linear node structure of this invention can be used recursively, if control structures can be included within if control structures, e.g., one or more inner if control structures can be included within an outer if control structure. The processing is the same as that described, except when an inner linear node structure representing an inner if structure completes processing, processing returns to the previous linear node structure representing the previous if control structure.

Figure 15:
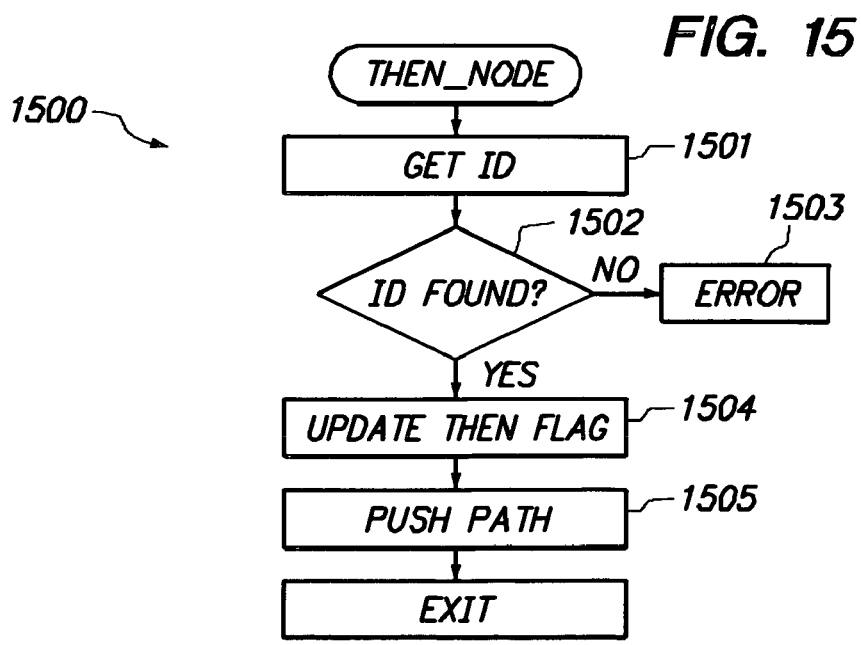
FIG. 15 is a process flow diagram of one embodiment of a then node method.

FIG. 15 is a process flow diagram for one embodiment of a then node method 1500. TABLE 15 is pseudo code for one embodiment of then node method 1500.

TABLE 15

```
Then_node{
    get the option ID (can't find => error)
    set then flag to indicate that the then path has been taken
    push the then path action into the parsing stack
}
```

In method 1500 (FIG. 15), get ID operation 1501 obtains the option ID for the then node. This makes the option ID the current item on the option stack, i.e., the current option ID. Get ID operation 1501 transfers to ID found check operation 1502.

If the option ID cannot be found, check operation 1502 transfers to error operation 1503, which in turn generates an error message. If the option ID is found, found check operation 1502 transfers processing to update then flag operation 1504.

In update then flag operation 1504, the then flag in the begin option node for the current option ID is set, and processing transfers to push path 1505. In push path operation 1505, the action in the then path is pushed on the parsing stack, and method 1500 is exited.

Figure 16:
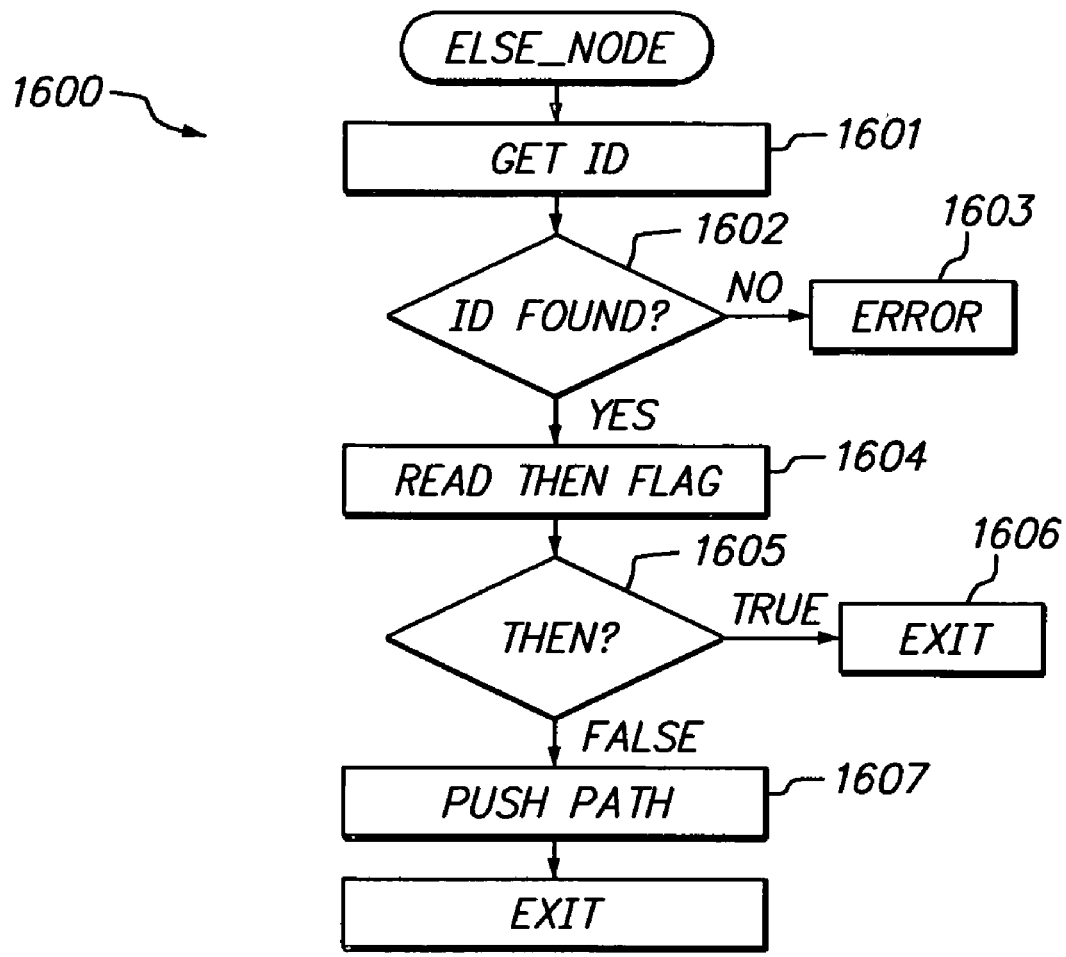
FIG. 16 is a process flow diagram of one embodiment of an else node method.

FIG. 16 is a process flow diagram for one embodiment of an else node method 1600. TABLE 16 is pseudo code for one embodiment of else node method 1600.

TABLE 16

```
Else_node{
    get the option ID (can't find => error)
    check then flag to determine if then path has been taken
    if then path has not been taken, push the else path action
        into the parsing stack
}
```

In method 1600 (FIG. 16), get ID operation 1601 obtains the option ID for the else node. This makes the option ID the current item on the option stack, i.e., the current option ID. Get ID operation 1601 transfers to ID found check operation 1602.

If the option ID cannot be found, check operation 1602 transfers to error operation 1603, which in turn generates an error message. If the option ID is found, found check operation 1602 transfers processing to read then flag operation 1604.

In read then flag operation 1604, the then flag in the begin option node for the current option ID is read, and processing transfers to check then flag operation 1605. If the then flag is set, operation 1605 transfers to end operation 1606 and otherwise to push path operation 1607. In push path operation 1607, the action in the else path is pushed on the parsing stack, and method 1600 is exited.

The linear command regeneration template for a command that includes an if control structure is the same as that described above. The then and else nodes are effectively no-ops, and the node following the then or else node is simply pushed on the stack. No special processing is required to handle either of these nodes. This is clear from FIGS. 13 and 14, where the paths described above with respect to the linear command regeneration template are the portion of each branch between the begin option node and the next option node.

The embodiments described herein are illustrative only of the principles of the invention and are not intended to limit the invention to the particular embodiments described. In view of this disclosure, those of skill in the art can implement embodiments in a wide variety of applications that use binary nodes in a parse tree. In addition, the physical device can be other than a network device.

Also, the memory shown in FIG. 2A and FIG. 2B is typically multiple memory units that include both volatile and non-volatile memories. The memory may include any suitable storage medium for the data files, for example, a hard disk, a floppy disk, a CD-ROM, magnetic tape, flash memory, random access memory, or any other suitable memory.

In more general terms, the methods of this invention are stored in a computer readable medium, and when any one of the methods is loaded from the computer readable medium into a memory of a device, the device is configured to be a special purpose machine that executes the method. This computer readable storage medium may belong to the device itself as illustrated in FIG. 2A and FIG. 2B, but the storage medium also may be external to the device and may be connected to the device by a data line or a network.

Figure 17:
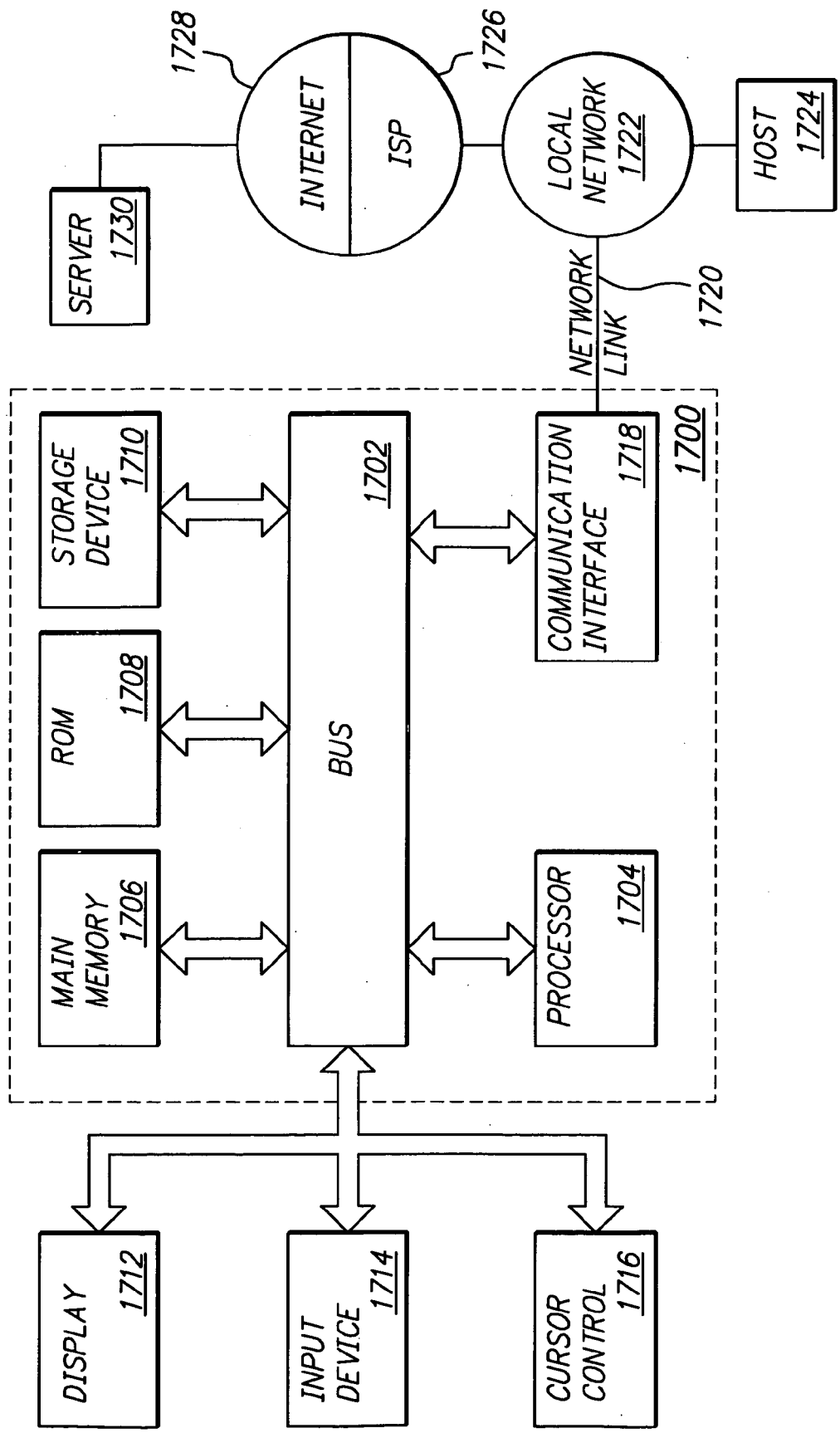
FIG. 17 is a block diagram of a computer system with which an embodiment may be implemented.

FIG. 17 is a block diagram that illustrates a computer system 1700 upon which an embodiment of the invention may be implemented. Computer system 1700 includes a bus 1702 or other communication mechanism for communicating information, and a processor 1704 coupled with bus 1702 for processing information. Computer system 1700 also includes a main memory 1706, such as a random access memory ("RAM") or other dynamic storage device, coupled to bus 1702 for storing information and instructions to be executed by processor 1704. Main memory 1706 also may be used for storing temporary variables or other intermediate information during execution of instructions to be executed by processor 1704. Computer system 1700 further includes a read only memory ("ROM") 1708 or other static storage device coupled to bus 1702 for storing static information and instructions for processor 1704. A storage device 1710, such as a magnetic disk or optical disk, is provided and coupled to bus 1702 for storing information and instructions.

Computer system 1700 may be coupled via bus 1702 to a display 1712, such as a cathode ray tube ("CRT"), for displaying information to a computer user. An input device 1714, including alphanumeric and other keys, is coupled to bus 1702 for communicating information and command selections to processor 1704. Another type of user input device is cursor control 1716, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane.

The invention is related to the use of computer system 1700 for re-constructing a network device configuration command based on configuration data stored in the network device. According to one embodiment of the invention, re-constructing a network device configuration command based on configuration data stored in the network device is provided by computer system 1700 in response to processor 1704 executing one or more sequences of one or more instructions contained in main memory 1706. Such instructions may be read into main memory 1706 from another computer-readable medium, such as storage device 1710. Execution of the sequences of instructions contained in main memory 1706 causes processor 1704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1704 for execution. Such a medium may take many forms, including but not limited to, non-volatile media, volatile media, and transmission media. Non-volatile media includes, for example, optical or magnetic disks, such as storage device 1710. Volatile media includes dynamic memory, such as main memory 1706. Transmission media includes coaxial cables, copper wire and fiber optics, including the wires that comprise bus 1702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1704 for execution. For example, the instructions may initially be carried on a magnetic disk of a remote computer. The remote computer can load the instructions into its dynamic memory and send the instructions over a telephone line using a modem. A modem local to computer system 1700 can receive the data on the telephone line and use an infrared transmitter to convert the data to an infrared signal. An infrared detector can receive the data carried in the infrared signal and appropriate circuitry can place the data on bus 1702. Bus 1702 carries the data to main memory 1706, from which processor 1704 retrieves and executes the instructions. The instructions received by main memory 1706 may optionally be stored on storage device 1710 either before or after execution by processor 1704.

Computer system 1700 also includes a communication interface 1718 coupled to bus 1702. Communication interface 1718 provides a two-way data communication coupling to a network link 1720 that is connected to a local network 1722. For example, communication interface 1718 may be an integrated services digital network ("ISDN") card or a modem to provide a data communication connection to a corresponding type of telephone line. As another example, communication interface 1718 may be a local area network ("LAN") card to provide a data communication connection to a compatible LAN. Wireless links may also be implemented. In any such implementation, communication interface 1718 sends and receives electrical, electromagnetic or optical signals that carry digital data streams representing various types of information.

Network link 1720 typically provides data communication through one or more networks to other data devices. For example, network link 1720 may provide a connection through local network 1722 to a host computer 1724 or to data equipment operated by an Internet Service Provider ("ISP") 1726. ISP 1726 in turn provides data communication services through the world wide packet data communication network now commonly referred to as the "Internet" 1728. Local network 1722 and Internet 1728 both use electrical, electromagnetic or optical signals that carry digital data streams. The signals through the various networks and the signals on network link 1720 and through communication interface 1718, which carry the digital data to and from computer system 1700, are exemplary forms of carrier waves transporting the information.

Computer system 1700 can send messages and receive data, including program code, through the network(s), network link 1720 and communication interface 1718. In the Internet example, a server 1730 might transmit a requested code for an application program through Internet 1728, ISP 1726, local network 1722 and communication interface 1718. In accordance with the invention, one such downloaded application provides for re-constructing a network device configuration command based on configuration data stored in the network device as described herein.

The received code may be executed by processor 1704 as it is received, and/or stored in storage device 1710, or other non-volatile storage for later execution. In this manner, computer system 1700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A network device comprising:
   a processor; and
   a memory coupled to said processor, and storing at least one linear node having a single entry and a single exit, said linear node comprising:
   a begin option node connected to said single entry;
   a next option node coupled to said begin option node; and
   an end option node directly coupled to said begin option node, said end option node connected to said single exit;
   wherein said linear node represents a command element of a command and is included in a linear parse tree in said memory upon said processor executing a process to parse the command.

2. The network device of claim 1, wherein said begin option node is coupled to a plurality of branches of said at least one linear node.

3. The network device of claim 2, wherein each branch in said plurality of branches of said linear node represents a different value for the command element represented by said linear node.

4. The network device of claim 2, wherein each branch in said plurality of branches is associated with a different next option node.

5. The network device of claim 1 wherein said memory further stores a binary node for said linear parse tree, said linear parse tree including both said binary node and said linear node.

6. The network device of claim 1 wherein said memory further stores a second linear node having a single entry and a single exit, said second linear node comprising:
   a second begin option node connected to said single exit of said at least one linear node;
   a second next option node coupled to said second begin option node; and
   a second end option node directly coupled to said second begin option node.

7. The device of claim 1, wherein the linear node is written to a command regeneration template.

8. The device of claim 1, wherein said command is a configuration command for configuring the network device.

9. A computer memory having a linear node structure recorded therein, wherein the linear node structure has a single entry and a single exit, said linear node structure comprising:
   a begin option node connected to the single entry of said linear node structure;
   a next option node coupled to said begin option node; and
   an end option node directly coupled to said begin option node and connected to the single exit of the linear node structure;
   wherein said linear node structure represents a command element of a command and is included in a linear parse tree that is used in a parsing process to parse the command.

10. The memory of claim 9 wherein said begin option node is coupled to a plurality of branches in said linear node structure.

11. The memory of claim 10 wherein each branch in said plurality of branches represents a different value of the command element represented by the linear node structure.

12. The memory of claim 10 wherein each branch in said plurality of branches is associated with a different next option node.

13. The memory of claim 9 further storing a second linear node structure having a single entry and a single exit, said second linear node structure comprising:
- a second begin option node connected to said single exit of said linear node structure;
- a second next option node coupled to said second begin option node; and
- a second end option node directly coupled to said second begin option node.

14. The memory of claim 9, additionally having a binary node for the linear parse tree stored therein.

15. The memory of claim 9, wherein said command is a configuration command for a network device.

16. The memory of claim 9, wherein the linear node structure is written to a command regeneration template.

17. A method of parsing a command having a first command element, the method comprising the computer-implemented steps of:
- creating a first linear node structure for representing said first command element, said first linear node structure comprising:
  - a begin option node having a single entry;
  - at least one next option node coupled to the begin option node;
  - an end option node having a single exit, said end option node directly connected to the begin option node; and
- using the first linear node structure in a linear parse tree to parse the command.

18. The method of claim 17, the command further having a second command element, the method further comprising the steps of:
- creating a second linear node structure for representing the second command element;
- said second linear node structure comprising:
  - a second begin option node having a single entry, said single entry of said second begin option node connected to the single exit of said first end option node;
  - at least one next option node coupled to the second begin option node;
  - a second end option node having a single exit; and
- using the second linear node structure in the linear parse tree to parse the command.

19. The method of claim 17, wherein said first begin option node is coupled to a plurality of branches of said first linear node structure.

20. The method of claim 19, wherein each branch in said plurality of branches of the first linear node structure represents a different value for the first command element represented by the first linear node structure.

21. The method of claim 19, wherein each branch in said plurality of branches is associated with a different next option node.

\* \* \* \* \*